(12) United States Patent
Brosha et al.

(10) Patent No.: US 12,195,320 B1
(45) Date of Patent: Jan. 14, 2025

(54) SYSTEM AND METHOD FOR DETECTION OF IMPURITIES DURING REFUELING

(71) Applicant: Triad National Security, LLC, Los Alamos, NM (US)

(72) Inventors: Eric L. Brosha, Los Alamos, NM (US); Rangachary Mukundan, Los Alamos, NM (US); Christopher J. Romero, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 245 days.

(21) Appl. No.: 17/984,621

(22) Filed: Nov. 10, 2022

Related U.S. Application Data

(60) Provisional application No. 63/278,946, filed on Nov. 12, 2021.

(51) Int. Cl.
| | | |
|---|---|---|
| *G01N 27/407* | (2006.01) | |
| *B67D 7/08* | (2010.01) | |
| *B67D 7/32* | (2010.01) | |
| *B67D 7/36* | (2010.01) | |
| *B67D 7/76* | (2010.01) | |
| *B67D 7/04* | (2010.01) | |

(52) U.S. Cl.
CPC ............ *B67D 7/085* (2013.01); *B67D 7/3272* (2013.01); *B67D 7/36* (2013.01); *B67D 7/76* (2013.01); *B67D 2007/0446* (2013.01)

(58) Field of Classification Search
CPC ........ B67D 7/085; B67D 7/3272; B67D 7/36; B67D 7/76; B67D 2007/0446
See application file for complete search history.

(56) References Cited

U.S. PATENT DOCUMENTS

| | | | | |
|---|---|---|---|---|
| 3,297,484 A | * | 1/1967 | Niedrach | H01M 8/08 429/500 |
| 5,246,792 A | * | 9/1993 | Watanabe | H01M 8/1004 429/492 |
| 5,578,388 A | * | 11/1996 | Faita | C25B 9/77 429/522 |
| 5,635,039 A | * | 6/1997 | Cisar | B01J 8/009 204/252 |

(Continued)

FOREIGN PATENT DOCUMENTS

| | | | | |
|---|---|---|---|---|
| JP | 2009048940 A | * | 3/2009 | |
| JP | 5785636 B2 | * | 9/2015 | ............ B60L 1/003 |

OTHER PUBLICATIONS

Mukundan et al., Development of an Electrochemical Hydrogen Contaminant Detector, *Journal of the Electrochemical Society*, Nov. 5, 2020, 167, 147507, 7 pages.

*Primary Examiner* — Bob Zadeh
(74) *Attorney, Agent, or Firm* — Klarquist Sparkman, LLP

(57) ABSTRACT

A fuel contamination detection system includes a fuel quality analyzer, a multiway valve, and a controller. The multiway valve includes a first inlet, a second inlet, and an outlet. The multiway valve also may include a switching device. The controller is electrically coupled to the analyzer. The controller may be coupled to the switching device, if present. Fuel is flowed through the fuel quality analyzer and an output current is measured to determine whether the fuel includes impurities. The controller is operable to signal a fuel dispensing system to dispense fuel if the fuel is sufficiently clean or cease dispensing fuel if the fuel is impure.

20 Claims, 27 Drawing Sheets

(56) References Cited

U.S. PATENT DOCUMENTS

| | | | | |
|---|---|---|---|---|
| 6,149,810 | A * | 11/2000 | Gonzalez-Martin | C25B 13/02 |
| | | | | 204/252 |
| 6,207,312 | B1 * | 3/2001 | Wynne | H01M 8/023 |
| | | | | 429/513 |
| 6,737,183 | B1 * | 5/2004 | Mazzucchelli | H01M 8/0232 |
| | | | | 429/465 |
| 8,003,274 | B2 * | 8/2011 | Spink | H01M 8/2455 |
| | | | | 429/534 |
| 10,490,833 | B1 * | 11/2019 | Brosha | H01M 8/04664 |
| 2005/0053821 | A1 * | 3/2005 | Jang | H01M 8/1007 |
| | | | | 429/481 |
| 2006/0059769 | A1 * | 3/2006 | Masel | H01M 8/1009 |
| | | | | 429/525 |
| 2008/0107949 | A1 * | 5/2008 | Yoshie | H01M 8/1011 |
| | | | | 429/444 |

* cited by examiner

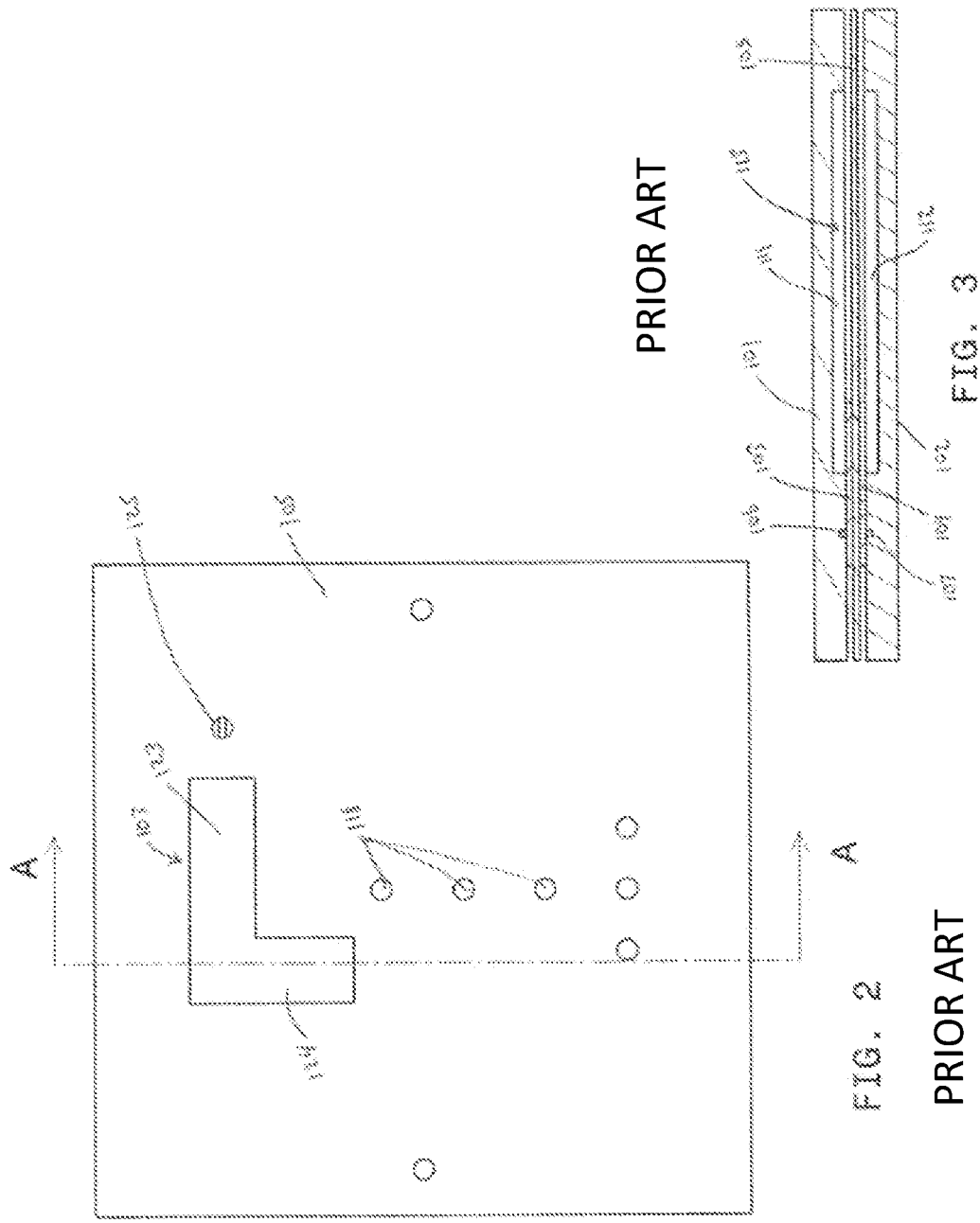

SYSTEM AND METHOD FOR DETECTION OF IMPURITIES DURING REFUELING

CROSS-REFERENCE TO RELATED APPLICATION

This application claims the benefit of the earlier filing date of U.S. Provisional Application No. 63/278,946, filed Nov. 12, 2021, which is incorporated by reference herein in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The United States government has certain rights in the invention.

FIELD

This disclosure concerns a fuel contamination detection system and a method of using the system.

BACKGROUND

Hydrogen fuel cells (FCs) utilize platinum (Pt) catalyst particles supported on carbon nanoparticles to split hydrogen (the fuel) and oxygen (the oxidizer) on the anode and cathode electrodes, respectively. These electrodes are separated by a proton conducting polymer electrolyte membrane. The electrons are carried via an external circuit to provide the power to do mechanical work through electric motors or supply electric power directly. Protons are transported through a special polymer electrolyte membrane (PEM) material that completes the electrochemical circuit. Because of the use of polymers, the fuel cell is called a PEMFC. To lessen the cost of fuel cells to be competitive with internal combustion engines, the amount of Pt is reduced as much as possible. Many individual fuel cells are combined into a "stack" in order to achieve high voltages and desired power output. Lowering the Pt content to lower catalyst costs makes the fuel cell stack affordable but also very vulnerable to poisoning by contaminants in the hydrogen fuel. The impurities bind to the active sites on the Pt catalyst and interfere with hydrogen adsorption and dissociation, which is critical to achieving high performance and efficiency.

Hydrogen may be used as fuel for passenger vehicles, trucks, buses, forklifts, stand-by power cells for communication towers, data center, emergency power for shelters/ natural disaster response, back-up power for hospitals and other critical needs, portable power for consumer, military, and first responder, applications, passenger aircraft, auxiliary power units, drones, maritime applications (e.g., manned and unmanned submarines), and other applications. All of these applications rely on high-purity hydrogen. The International Organization for Standards (ISO) and Society of Automotive Engineers (SAE) specifications for PEMFC fuel quality standards set out the maximum allowable contaminant levels for hydrogen fuel. The hydrogen fuel index (Type I, Type II, Grade D) should have a minimum purity of 99.97% (mole fraction) with a maximum of 300 μmol/mol non-hydrogen gases. The highest risk contaminants, based on potential harm to the PEMFC and performance loss, are carbon monoxide, sulfur species, and ammonia. The maximum allowable concentration of carbon monoxide is 0.2 μmol/mol, the maximum allowable concentration of sulfur compounds ($H_2S$ basis) is 0.004 μmol/mol, and the maximum allowable concentration of ammonia is 0.1 μmol/mol.

A need exists for a system and method for detecting a contaminant or contaminants in fuels, such as hydrogen, to avoid dispensing contaminated fuel and poisoning the hydrogen FCs.

SUMMARY

A system and method for detecting a contaminant or contaminants in fuels are disclosed. In some embodiments, a fuel contamination detection system includes a multiway valve comprising a first inlet, a second inlet, and an outlet; an analyzer fluidly connected to the outlet; and a controller electrically coupled to the analyzer. In some embodiments, the system further comprises a flow control device between the outlet and the analyzer.

One embodiment of a disclosed analyzer comprises (i) an anode flow field plate defining a first fuel flow field channel, (ii) a cathode flow field plate defining a second fuel flow field channel, (iii) a humidified polymer electrolyte membrane between the anode and cathode flow field plates, (iv) a first electrode between the anode flow field plate and the humidified polymer electrolyte membrane, the first electrode having a first platinum loading, (v) a second electrode between the cathode flow field plate and the humidified polymer electrolyte membrane, the second electrode having a second platinum loading higher than the first platinum loading, and (vi) a reservoir volume defined by the anode and cathode flow field plates and configured to retain water, wherein at least a portion of the humidified polymer electrolyte membrane extends into the reservoir volume, wherein the reservoir volume is separate from each of the first fuel flow field channel and the second fuel flow field channel, and wherein at least one of the first electrode or the second electrode comprises a first portion outside the reservoir volume and aligned with the first fuel flow field channel or the second fuel flow field channel, and a second portion extending into the reservoir volume The controller is configured to receive a current output from the analyzer, compare the current output to a predetermined limit, and send a signal to a fuel dispensing system to suspend fuel flow through the fuel dispensing system if the current output is below the predetermined limit. In any of the foregoing or following embodiments, the controller may be further configured to open and close the first inlet of the multiway valve; and open and close the second inlet of the multiway valve. In some embodiments, the controller is further configured to increase or decrease an operating voltage of the analyzer. In some implementations, the multiway valve further comprises a switching device operable to open and close the first inlet and the second inlet, and the controller is further configured to operate the switching device.

In some embodiments, a method for using a fuel contamination system as disclosed herein, includes: initiating fuel flow through a fuel system comprising a sample take-off valve and fuel dispensing outlet; flowing a portion of the fuel through the sample take-off valve and through a first inlet of a multiway valve, the multiway valve further comprising an outlet fluidly connected to an analyzer and a second inlet; flowing the portion of the fuel through the outlet and into the analyzer, the analyzer operated at a first voltage; receiving, with a controller electrically coupled to the analyzer, an initial current output of the analyzer operating at the first voltage, the controller further configured to (i) determine a predetermined limit for current output, (ii) compare the initial current output to the predetermined limit, (iii) send a signal to the fuel dispensing system, and (iv) increase or decrease an operating voltage of the analyzer; comparing the initial current output to a predetermined limit; and either (i) sending a signal to the fuel system to suspend fuel flow through the fuel dispensing outlet if the initial current output is below the predetermined limit; or (ii) flowing fuel through the fuel dispensing outlet if the initial current output is at or above the predetermined limit. In some embodiments, the predetermined limit is a current output corresponding to 200 ppb CO in $H_2$, 4 ppb $H_2S$, 100 ppb $NH_3$, or any combination thereof. In any of the foregoing or following embodiments, the method may further include suspending fuel flow through the fuel dispensing outlet if the initial current output is at or above the predetermined limit.

In any of the foregoing or following embodiments, when fuel is flowing through the fuel dispensing outlet, the method may further include continuously flowing a portion of the fuel through the first inlet and into the analyzer while flowing fuel through the fuel dispensing system; continuously or intermittently receiving a current output of the analyzer and comparing the current output at the first voltage to the predetermined limit; and sending a signal to the fuel dispensing system to suspend fuel flow through the fuel dispensing outlet if the current output at the first voltage is below the predetermined limit.

In any of the foregoing or following embodiments, the method may further include applying an increased voltage pulse to the analyzer at periodic intervals; and subsequently operating the analyzer at the first voltage. Applying the increased voltage pulse may remove contaminants bound to the analyzer electrodes. In any of the foregoing or following embodiments, (i) the first voltage may be +0.08 V to +0.5 V, (ii) the increased voltage may be +1.0 V to +1.6 V, or (iii) both (i) and (ii).

In any of the foregoing or following embodiments, the impurities may comprise carbon monoxide, hydrogen sulfide, or a combination thereof. In some embodiments, the method further includes determining whether the impurities comprise carbon monoxide, hydrogen sulfide, or carbon monoxide and hydrogen sulfide.

The foregoing and other objects, features, and advantages of the invention will become more apparent from the following detailed description, which proceeds with reference to the accompanying figures.

BRIEF DESCRIPTION OF THE DRAWINGS

FIG. 2 is a top view of the FQA of FIG. 1A.

FIG. 3 is a cross-sectional view of the FQA of FIG. 2 taken along line A-A.

DETAILED DESCRIPTION

Figure 1A:
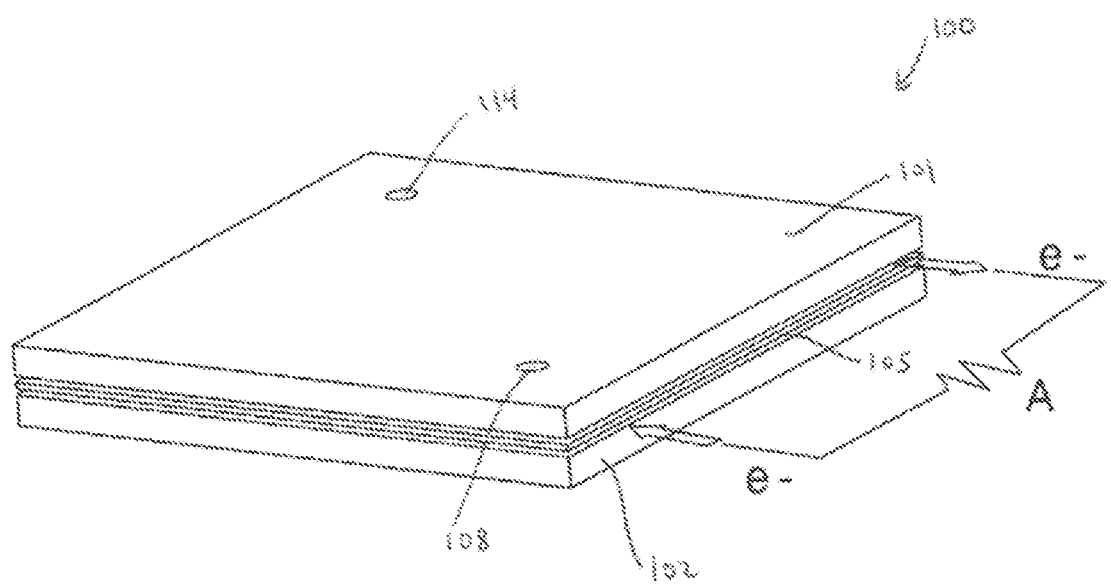
FIGS. 1A and 1B, respectively are a perspective view and an exploded perspective view of an exemplary fuel quality analyzer (FQA).
Figure 1B:
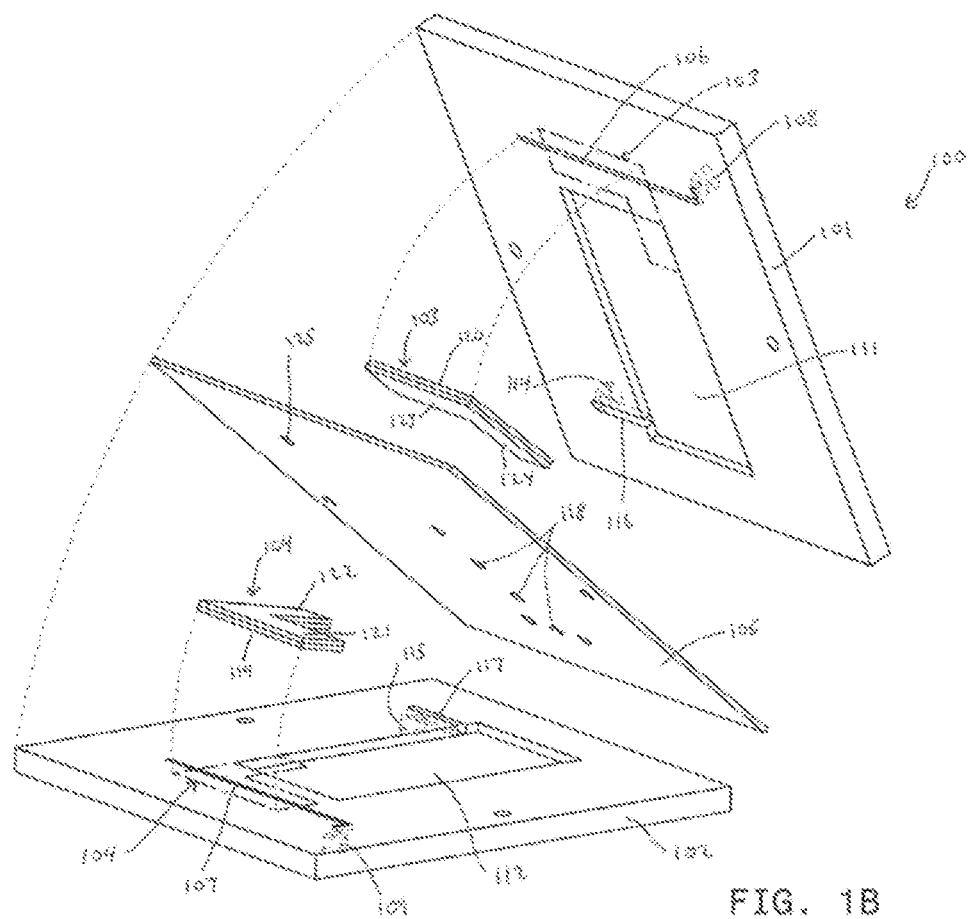

A system and method for detecting a contaminant or contaminants in fuels are disclosed. For example, the system and method can be used to detect CO and/or $H_2S$ in hydrogen fuel.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

In order to facilitate review of the various embodiments of the disclosure, the following explanations of specific terms are provided:

Anode: An electrode through which electric charge flows into a polarized electrical device. From an electrochemical point of view, negatively-charged anions move toward the anode and/or positively-charged cations move away from it to balance the electrons leaving via external circuitry.

Bound/bind: As used herein, the terms "bound" and "bind" refer to binding by covalent, ionic, or electrostatic interactions.

Canary species: As used herein, the term "canary species" refers to a molecule or atom that, if supplied above a certain concentration in a gas stream to a fuel cell will have a significant negative impact on the fuel cell performance, such as by reducing a current output of the fuel cell.

Cathode: An electrode through which electric charge flows out of a polarized electrical device. From an electrochemical point of view, positively charged cations invariably move toward the cathode and/or negatively charged anions move away from it to balance the electrons arriving from external circuitry.

Electrically coupled: In electrical communication; capable of sending and receiving electrical signals between components/devices.

FCD: Fuel contamination detection system. When the fuel is hydrogen, the system may be referred to as an HCD (hydrogen contamination detection) system.

FQA: Fuel quality analyzer

Ionomer: A polymer comprising electrically neutral moieties and ionized moieties covalently bonded to a polymer backbone as pendant groups.

Polymer electrolyte membrane: A semipermeable membrane comprising ionomers and capable of conducting protons.

II. Fuel Contamination Detection System

Embodiments of a fuel contamination detection system comprising a fuel quality analyzer (FQA) are disclosed. Embodiments of a suitable FQA are disclosed in U.S. Pat. No. 10,490,833 B1, which is incorporated by reference in its entirety herein.

With reference to FIGS. 1A, 1B, 2, and 3, a fuel quality analyzer 100 according to one embodiment includes an anode flow field plate 101, a cathode flow field plate 102 opposite the anode flow field plate 101, a first or working electrode 103 (e.g., a sensing electrode), a second or counter electrode 104, and a polymer electrolyte membrane 105 (e.g., NAFION™). The polymer electrolyte membrane 105 is sandwiched between the working electrode 103 and the counter electrode 104. The polymer electrolyte membrane 105, the working electrode 103, and the counter electrode 104 are sandwiched between the cathode flow field plate 101 and the anode flow field plate 102. When a constant voltage is applied across the electrodes 103, 104 and a fuel is pumped through the analyzer 100, the analyzer 100 outputs a current A.

In the illustrated embodiment, an inner surface of the anode flow field plate 101 facing the membrane 105 defines a fuel flow field channel 106, and an inner surface of the cathode flow field plate 102 facing the membrane 105 defines a corresponding fuel flow field channel 107 (e.g., the anode and the cathode flow field plates 101, 102 each define a single pass flow field 106, 107). Additionally, the anode flow field plate 101 defines a fuel inlet port 108 for directing a fuel (e.g., a test fuel sample of hydrogen gas) into the fuel flow field channel 106, and the cathode flow field plate 102 defines a fuel outlet port 109 for directing the fuel out of the fuel quality analyzer 100.

In the illustrated embodiment, the inner surfaces of the anode flow field plate 101 and the cathode flow field plate 102 each define a recess 111, 112, respectively. The recesses 111, 112 each have a depth less than a thickness of the respective flow field plate 101, 102. In the illustrated embodiment, the recesses 111, 112 are adjacent to the fuel flow field channels 106, 107, respectively. Together, the recesses 111, 112 define a reservoir volume 113. The reservoir volume 113 is fully enclosed and surrounded by the flow field plates 101, 102. The reservoir volume 113 is configured to hold and retain a volume of water to contact and humidify the polymer electrolyte membrane 105. Humidification improves membrane ion conductivity and improves performance of the analyzer 100. Since at least a portion of the polymer electrolyte membrane 105 extends into or through the reservoir volume 113 and is exposed to or immersed in the water contained in the reservoir volume 113, the membrane 105 is humidified from the reservoir volume 113. Thus, the fuel (e.g., the test fuel sample of hydrogen) does not need to be humidified before delivery to the analyzer 100.

In the illustrated embodiment, the anode flow field plate 101 and the cathode flow field plate 102 each define a water inlet/outlet port 114, 115 (e.g., a through hole) and a groove or channel 116, 117 extending between and connecting the port 114, 115 and the recess 111, 112, respectively. The ports 114, 115 in the anode flow field plate 101 and the cathode flow field plate 102 are configured to direct water into and out from the reservoir volume 113, respectively. The water in the reservoir volume 113 may be continually refreshed (e.g., cycled through the analyzer 100) from a water supply source separate from the analyzer 100. Alternatively, the water in the reservoir volume 113 may be periodically refreshed. Additionally, in the illustrated embodiment, the polymer electrolyte membrane 105 defines a series of water pass-through openings 118. Water pumped into the reservoir volume 113, for example, from the port 114 in the anode flow field plate 101, passes through the water pass-through openings 118 in the polymer electrolyte membrane 105 and, for example, out through the port 115 in the cathode flow field plate 102. In one or more embodiments, the water may be pumped into the reservoir volume 113 from the port 115 in the cathode flow field plate 102 and out through the port 114 in the anode flow field plate 101. In the illustrated embodiment, the cross-sectional area of the reservoir volume 113 is smaller than the area of the polymer electrolyte membrane 105 such that only a portion of the polymer electrolyte membrane 105 extends into, and is exposed and immersed in, the reservoir volume 113. A portion of the water pumped into the reservoir volume 113 is absorbed by the portion of the membrane 105 extending into or through the reservoir volume 113, and then the water is wicked along and/or through the membrane 105 to portions of the membrane 105 that do not extend into the reservoir volume 113.

In the illustrated embodiment, the counter electrode 104 is loaded with a relatively higher amount of platinum (Pt) or platinum-ruthenium (Pt—Ru) alloy 119, and the working electrode 103 is loaded with a relatively lower amount of Pt 120. Reducing the Pt loading of the working electrode 103 compared to the counter electrode 104 advantageously increases the sensitivity of the analyzer 100 to contaminants in the fuel and/or reduces response time of the analyzer 100. Additionally, in one or more embodiments, the working electrode 103 and/or the counter electrode 104 may be provided without an ionomer such as NAFION™ (e.g., the working electrode 103 and/or the counter electrode 104 may be provided either directly on a gas diffusion layer or on a micro-porous layer). For example, the Pt 119, 120 may be applied, for example, by sputtering, directly on a gas diffusion layer (GDL) material with or without a microporous layer. In one or more embodiments, the area density of the Pt 120 on the working electrode 103 may be from greater than 0 mg/cm$^2$ to less than 0.1 mg/cm$^2$, such as from 0.01 mg/cm$^2$ to 0.05 mg/cm$^2$ or from 0.02 mg/cm$^2$ to 0.04 mg/cm$^2$, and the area density of the Pt or Pt—Ru 119 on the counter electrode 104 benefits from a comparably much higher loading and may be 0.2 mg/cm$^2$ or higher. In one or more embodiments, the area density of the Pt 120 on the working electrode 103 may be from 0.02 mg/cm$^2$ to 0.04 mg/cm$^2$ and the area density of the Pt or Pt—Ru 119 on the counter electrode 104 may be 0.2 mg/cm$^2$ or higher.

The portions 122, 124 of the working electrode 103 and the counter electrode 104 extending into the reservoir volume 113 are configured to absorb water in the reservoir volume 113 and wick the water to the portions 121, 123 of the working electrode 103 and the counter electrode 104 outside of the reservoir volume 113. Providing the working electrode 103 and the counter electrode 104 each with a portion 122, 124 that extends into the reservoir volume 113 such that water is transported to the working electrode 103 and the counter electrode 104 enables operating the analyzer 100 at higher flow rates of dry gas. The humidification of the electrodes 103, 104 and the membrane 105 provided by the water in the reservoir volume 113 is configured to mitigate an increase in the high frequency resistance (HFR) of the analyzer 100, which would otherwise occur if the electrodes 103, 104 and/or the membrane 105 dried out. This mitigation against increasing HFR of the analyzer 100 permits higher flow rates of dry gas to be flowed through the analyzer 100. In one or more embodiments, significantly higher flow rates of dry H$_2$ may be flowed through the analyzer 100 without completely drying out the electrodes 103, 104 and the membrane 105 compared to an analyzer without including humidification. The hydrophobic and hydrophilic properties of the working electrode 103 and the counter electrode 104, as well the size of the portions 122, 124 of the working electrode 103 and the counter electrode 104, may be selected based on the desired amount of water absorbed by the working electrode 103 and the counter electrode 104 and the desired flow rate of the fuel through the analyzer 100. Additionally, in one or more embodiments, the rate of water transport to the electrodes 103, 104 is balanced by the rate of evaporative water losses from the electrodes 103, 104 to the dry test gas being analyzed. Additionally, in some embodiments the electrodes 103, 104 comprise ionomer surrounding the Pt catalyst. If water is lost in the electrode ionomer, the proton conductivity falls, the resistance increases, and the total electrode resistance increases, resulting in a decreased pumping current. The decreased pumping current will cause the low frequency resistance to rise in the impedance spectra. Thus, in some implementations, the flow rate through the analyzer 100 is controlled to maintain adequate humidification of the internal components.

In some embodiments, the analyzer 100 may include one or more gaskets (not shown) between the anode flow field plate 101 and the cathode flow field plate 102. Additionally, In any of the foregoing or following embodiments, the working electrode 103, the membrane 105, and the counter electrode 104 may be compressed between the anode flow field plate 101 and the cathode flow field plate 102 such that the fuel supply may be pressurized.

In operation, fuel flows through the fuel inlet port 108 in the anode flow field plate 101 and along the fuel flow field channel 106 in the anode flow field plate 101 (i.e., the fuel flows between the anode flow field plate 101 and the working electrode 103 that is humidified by the reservoir volume 113). As the fuel flows along the fuel flow field channel 106 in the anode flow field plate 101, any contaminants in the fuel poison the Pt 120 on the working electrode 103 or get incorporated into the NAFION™ in the membrane 105 or the working electrode 103 (e.g., CO and $H_2S$ contaminants adsorb on the Pt, but $NH_3$ contaminants are incorporated as $NH_4^+$ ions into the NAFION™ membrane where they displace H+ and decrease conductivity). When the fuel reaches the end of the fuel flow field channel 106, the fuel flows through the fuel pass-through opening 125 in the polymer electrolyte membrane 105 that is humidified by the water in the reservoir volume 113 and into the fuel flow field channel 107 in the cathode flow field plate 102. The fuel then flows along the flow field channel 107 in the cathode flow field plate 102 and out of the fuel outlet port 109 in the cathode flow field plate 102. In this manner, the analyzer 100 exposes the working electrode 103 to any contaminants in the fuel before exposing the counter electrode 104 to any contaminants in the fuel supply, which helps to protect the counter electrode 104 against poisoning and thereby permits the counter electrode 104 to serve as a pseudo-reference electrode. The counter electrode 104, which serves as a pseudo-reference electrode, is also protected against poisoning by virtue of its relatively high catalyst loading. Protecting the counter electrode 104 from poisoning is configured to preserve the full performance of the counter electrode 104 (i.e., the pseudo-reference electrode), while further sensitizing the working electrode 103 to the contaminants.

Water in the reservoir volume 113 humidifies the polymer electrolyte membrane 105, the working electrode 103, the counter electrode 104, and the fuel passing through the analyzer 100. In one or more embodiments, the anode and cathode flow field plates 101, 102 may be provided without the ports 114, 115 or the ports 114, 115 may be capped off or plugged. For example, in one or more embodiments, the ports 114, 115 may be capped off when the analyzer 100 is used to detect the presence of contaminants in fuel streams having relatively high pressures (e.g., a pressure corresponding to a flow rate of ~100 standard cubic centimeters per minute (sccm)). In an embodiment in which the ports 114, 115 are capped off, the water in the reservoir volume 113 may be periodically replenished after the water has been consumed during operation of the analyzer. Additionally, in one or more embodiments in which the ports 114, 115 are capped off and the fuel stream has a higher-than-ambient pressure, the water may be injected into the reservoir volume 113 at an elevated pressure to balance the pressure of the fuel stream flowing through the analyzer 100. In some embodiments, water is consumed at a rate of about 250 µL water per day when the gas flow rate is 100 sccm. In some embodiments, the reservoir volume 113 is sufficient to operate the analyzer for 3 weeks between water refills when the gas flow rate is 100 sccm. In certain implementations, an external water reservoir may be used to replenish the reservoir volume 113 for several months. In an independent implementation, a high-purity water source and pump may be connected to the reservoir volume 113 to maintain a sufficient water supply for uninterrupted operation.

When a fuel free or substantially free from contaminants flows through the analyzer 100, the output current at a fixed supply voltage of the analyzer 100 is constant or substantially constant. When contaminants are present in the fuel supply, the contaminants (e.g., CO) poison the Pt 120 on the working electrode 103, which causes the output current of the analyzer 100 to drop in proportion to the concentration of the contaminants in the fuel supply. Accordingly, the presence of contaminants in the fuel supply may be detected by monitoring the output current of the analyzer 100 and monitoring for a drop in the output current.

In any of the foregoing or following embodiments, fuel flow through the analyzer 100 may be controlled since flow variations may alter and possibly exceed the ability of the internal water reservoir to transport water to the electrodes and membrane to maintain proton conductivity. This will lead to reduced pumping current, while reducing the flow rate will permit a higher water content in the electrodes and membrane leading to higher proton conductivity and a higher hydrogen pumping current. In deployments where the sample gas pressure is constant, a fixed orifice may be used to meter the desired sample gas flow rate; in situations where the delivery pressure and flowrate are variable, a mass flow controller may be used to maintain the desired gas flow rate.

Figure 4:
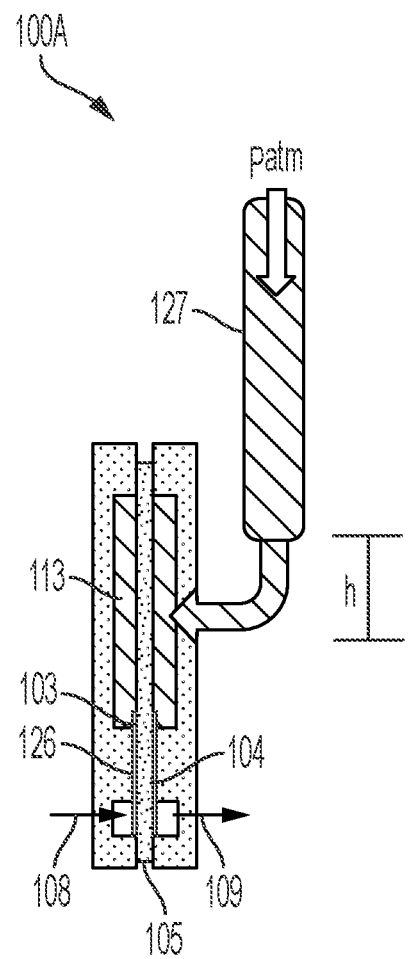
FIG. 4 is a cross-sectional view of an FQA including an external water reservoir assembly.
Figure 5:
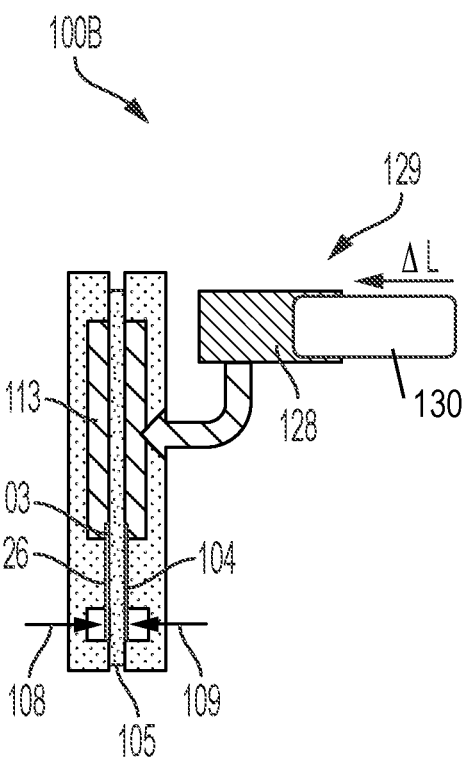
FIG. 5 is a cross-sectional view of an FQA including an external water supply and pumping means.

In some embodiments, it is desirable to vary the amount of water supplied to the reservoir volume 113. For example, when operating at increased gas flow rates, it is advantageous to increase the rate at which the reservoir volume 113 is replenished. FIGS. 4 and 5 illustrate two exemplary FQAs that allow variation in the amount of water supplied to the reservoir volume 113. In FIGS. 4 and 5, components 103-105, 108, 109, and 113 are as previously described. Water wicking tabs 126 extend into the reservoir volume 113, thereby wicking water toward the fuel inlet and outlet ports 108, 109. In the illustrated embodiments, the working electrode 103 is deposited onto a water wicking tab 126. The counter electrode 104 may be deposited onto a water wicking tab 126, or the water wicking tab itself may also serve as the counter electrode 104.

In the illustrated embodiment of FIG. 4, the analyzer 100a further comprises an external, adjustable-height water reservoir assembly 127, such as a water sight glass. The external, adjustable-height water reservoir assembly 127 is fluidly connected to the water reservoir volume 113. The external, adjustable-height water reservoir assembly 127 may be raised or lowered to vary the height h between a bottom of the assembly 127 and its connection to the reservoir volume 113. The external, adjustable-height water reservoir assembly 127 is subjected to atmospheric pressure, $p_{atm}$, and water is gravity fed into the water reservoir volume 113. Raising the external, adjustable-height water reservoir assembly 127 increases water pressure applied to the water wicking tabs 126. The change in pressure, $\Delta p$ ($N/m^2$), is proportional to the height h:

$$\Delta p = \mu g h$$

where p is the mass density of water ($kg/m^3$), g is the acceleration of gravity (9.8 $m/s^2$), and h is the height (m). As the height increases (e.g., from a starting height of 2 cm to 8 cm above the FQA to a height of 25 to 30 cm above the FQA), $\Delta p$ increases, thereby increasing the rate at which water is taken up by the wicking tabs 126. In the absence of the external, adjustable-height water reservoir assembly, the gas flow rate through the inlet and outlet ports 108, 109 is limited because an excessive gas flow rate dries out the wicking tabs 126 faster than the water is replaced. The output current of the analyzer 100a decreases as the wicking tabs 126 dry out, thereby diminishing the ability to detect contaminants in the gas. The increased hydrostatic pressure provided by the external, adjustable-height water reservoir assembly 127 maintains the water content of the wicking tabs 126, thereby maintaining the output current of the analyzer 100a even at higher gas flow rates. For example, the gas flow rate may be increased by 10%, 25%, 50%, 75%, or even 100%, such as from 100 mL/min. to 200 mL/min.

In the illustrated embodiment of FIG. 5, the analyzer 100b further comprises an external water reservoir 128 fluidly connected to the reservoir volume 113, and a pump 129 operable to pump water from the reservoir 128 into the reservoir volume 113. The pump 129 may be any suitable pump, such as a programmable syringe pump, a positive displacement pump, or any other pumping means. In FIG. 5, $\Delta L$ represents movement of a plunger or piston 130 of a syringe or syringe pump, or similar positive displacement pump apparatus, that pushes against the incompressible volume of water thus filling the reservoir volume 113. The rate that the piston 130 moves, $\Delta L/\hat{o}t$, may be set to balance the water consumption rate or water evaporated to the dry gas stream. In some implementations, the external water reservoir and pumping means are two components of a single device; for example, the external water reservoir may be a vessel within the pumping means. In other implementations, the external water reservoir and pumping means are separate devices operably connected such that the pumping means 129 can push water from the external water reservoir 128 into the reservoir volume 113. In some embodiments, the pumping means 129 is operable to pump water from the external water reservoir 128 into the reservoir volume 113 at a set volumetric rate. For example, the volumetric rate may be selected to equal the rate at which water is lost to evaporation during operation of the analyzer 100b. Pumping water into the reservoir volume 113 applies hydrostatic within the reservoir volume 113, increasing the rate at which water is taken up by the wicking tabs 126. The water injection rate and/or the gas flow rate may be selected to provide a desired baseline pumping current.

Advantageously, the external, adjustable-height water reservoir assembly 127 of FIG. 4 or the external water reservoir 128 and pump 129 of FIG. 5 facilitate the use of higher gas flow rates through the fuel inlet and outlet ports 108, 109, without drying out the water wicking tabs 126. For example, the external, adjustable-height water reservoir assembly or external water reservoir/pump may enable a gas flow rate twice as high as without the external water reservoir, e.g., a gas flow rate of 200 mL/min. compared to a gas flow rate of 100 mL/min. Without these features, the higher gas flow rates dry the wicking tabs 126 more quickly than the water is replenished, resulting in low hydrogen pumping current and lost sensitivity. In contrast, the FQAs 100a, 100b of FIGS. 4 and 5 allow high gas flows and reduced impurity detection time without sacrificing baseline current and/or FQA sensitivity.

Figure 6:
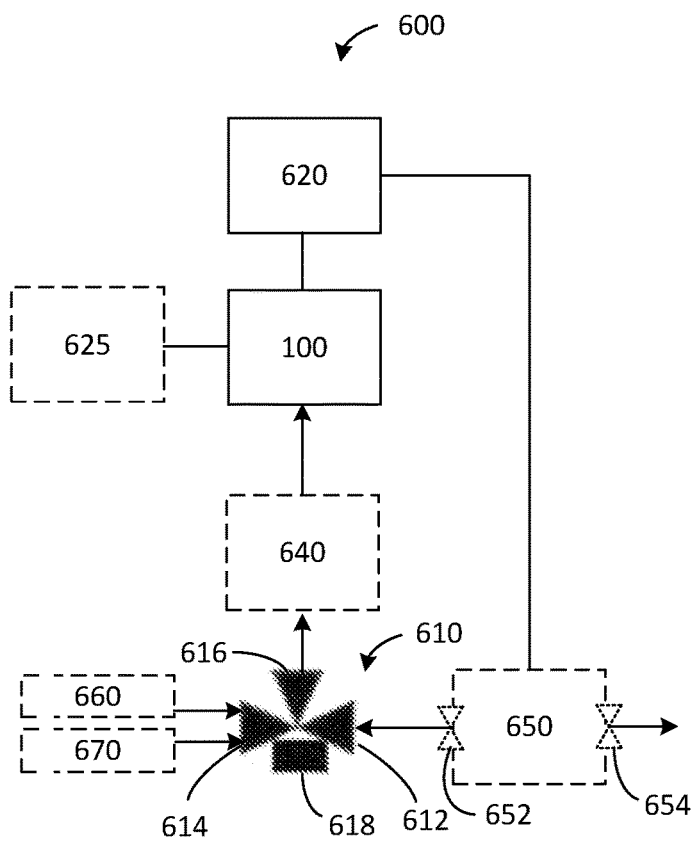
FIG. 6 is a schematic diagram of one embodiment of a fuel contamination detection system.

FIG. 6 illustrates one embodiment of a fuel contamination detection (FCD) system 600 comprising a FQA 100 as disclosed herein. The FCD system 600 further comprises a multiway valve 610 and a controller 620.

The controller 620 may be, for example, a computer or similarly programmable control device configured to perform the following functions: sense and maintain FQA temperature, measure and maintain sample gas flow through the FQA, control humidification system by managing water—either position of displacement device, e.g. L or $\Delta L$ pumping water into internal reservoir 113, apply precise voltage levels to FQA, measure and report pumping current, compare pumping current to desired threshold determined from calibration response deviation from baseline pumping current measured when sampling zero or reference purity hydrogen, control the state of multi-position sampling valve, and/or send a signal to allow or suspend refueling at the point of sale dispenser.

The multiway valve 610 comprises a first inlet 612, a second inlet 614, and an outlet 616. In some embodiments, the multiway valve further comprises a switching device 618, wherein the switching device 618 is operable to open and close the first inlet 612 and the second inlet 614. In some aspects, the multiway valve 610 may include additional inlets and/or outlets. For example, the multiway valve 620 may include one or more inlets for sample fuels, a clean or "zero" fuel inlet, and one or more calibration or impure fuel inlets. In such aspects, the switching device 618 is operable to open and close each of the inlets and outlets present in the multiway valve. In any of the foregoing or following embodiments, the system may further comprise a flow control device 640 between the outlet 616 and the analyzer 100. In any of the foregoing or following embodiments, the system 600 may further comprise a fuel system 650, a control fuel supply source 660, such as a clean fuel supply source, and/or an impure fuel supply source 670.

In any of the foregoing or following embodiments, the FQA 100 may be protected from wide temperature variations. For example, the analyzer may be maintained at a temperature of 20-40° C., such as a temperature of 25-35° C. or a temperature of 28-32° C. In some embodiments, FQA temperature is maintained with a thermoelectric (TE) temperature control system. The FCD system 600 may further comprise a bi-polar TE system 625 capable of thermoelectrically heating or cooling the FQA 100 to maintain a desired temperature. In one implementation, the analyzer is placed into a temperature-controlled enclosure to maintain the desired temperature.

The controller 620 is electrically coupled to the analyzer 100, and is configured to receive a current output from the analyzer 100 and compare the current output to a predetermined limit (i.e., a predetermined current output limit). The controller 620 is further configured to control (i.e., increase or decrease) an operating voltage of the analyzer 100. The controller may be configured to periodically increase or decrease the operating voltage at defined time intervals. In some embodiments, the controller 620 further is electrically coupled to the switching device 618 of the multiway valve 610 such that the controller 620 can send a signal to the switching device 618 to open and close the first and second inlets 612, 614 as needed during system operation.

In any of the foregoing or following embodiments, the FCD system 600 may be electrically and fluidly coupled to a fuel system 650 such that the controller 620 is electrically connected to the fuel system 650, and a sample take-off valve 652 of the fuel system is fluidly connected to the first inlet 612 of the multiway valve 610. The fuel system further comprises a valve/outlet controller to open and close the sample take-off valve 652 and fuel dispensing outlet 654. The valve/outlet controller to open and close the sample take-off valve are conventional and known to those skilled in the art of fuel systems. The controller 620 is configured to send signals to the fuel system 650 to permit or suspend fuel flow through the fuel dispensing outlet 654 and, optionally, through the sample take-off valve 652. For instance, the controller 620 may signal the fuel system 650 to permit fuel flow by opening the fuel dispensing outlet 654, or to cease fuel flow by closing the fuel dispensing outlet 654. The controller 620 may further signal the fuel system 650 to open or close the sample take-off valve 652. In some embodiments, the fuel system 650 is a fuel dispensing system, such as a hydrogen fuel dispensing system. In an independent embodiment, the fuel system is part of a fuel production system, fuel transportation/delivery system (for example, a hydrogen tube trailer), fuel storage system, or fuel purification system. In some implementations, the FCD system is coupled downstream from a fuel production system, a fuel purification system, or a fuel dispensing system.

In any of the foregoing or following embodiments, a control fuel supply source, such as a clean fuel supply source, 660 may be fluidly connected to the second inlet 614. The clean fuel supply source 660 may be a high purity reference or "zero" gas, such as ultra-pure $H_2$, and can be used to set a baseline current value corresponding to clean fuel. Alternatively, or in addition, the clean fuel supply source 660 may be provide a clean fuel that flows through the system to maintain a stable baseline when the system is not in use. In certain implementations, the second inlet 614 may be switchable between the clean fuel supply source 660 and an impure fuel supply source 670. In some aspects, the impure fuel supply source 670 may be a calibration gas containing a known amount of an impurity for period recalibration of the system or a challenge gas to verify that the system is working correctly to detect impurities. Alternatively, the fuel supply source 670 may be gas obtained from another location within the facility at which the system is located. The switching device 618 may further be operable to switch the second inlet 614 between receiving the clean fuel and the impure fuel.

III. Method of Use

Embodiments of a method for using the disclosed fuel contamination detection system (FCD) are disclosed. In any of the following embodiments, the controller of the FCD is electrically coupled to the fuel quality analyzer (FQA), and is configured to (i) receive current outputs from the FQA, (ii) determine a predetermined limit for the current output, (iii) compare the current output to the predetermined limit, (iv) send signals to the fuel dispensing system, and/or (v) increase or decrease an operating voltage of the FQA. In some embodiments, the controller further is configured to operate a switching device of the FCD and/or trigger an alarm, such as an audible and/or visual alarm.

In any of the foregoing or following embodiments, the FQA may be used to detect a canary species present in the fuel. For example, the U.S. Department of Energy (DOE) has identified carbon monoxide as a leading canary species for hydrogen contamination. More specifically, 200 ppb CO is defined as the canary species by the DOE. In steam methane reforming of natural gas to produce hydrogen, CO has the highest purification ratio, thereby serving well as the canary species. The concentration of many other impurities of concern in hydrogen very closely track the CO levels, thereby further validating CO as the canary species.

In any of the foregoing or following embodiments, the FQA may be sufficiently sensitive to detect contaminants at a level as low as 100 ppb CO, 50 ppb CO, or even 10 ppb CO. In some embodiments, the canary species CO may be detected in less than 60 seconds. In certain implementations, an analytical measurement can be determined to within <5% error in 30-60 minutes.

However, embodiments of the disclosed system and method are useful for detecting more contaminants in a flow stream than just the canary species. In any of the foregoing or following embodiments, the FQA also may be sufficiently sensitive to detect $H_2S$ levels as low as 10 ppb $H_2S$, 4 ppb $H_2S$, or even 1 ppb $H_2S$. $H_2S$ detection generally is slower since $H_2S$ poisons the working electrode more slowly. In some embodiments, $H_2S$ may be detected in from greater than 10 seconds to less than 5000 seconds, such as in a range having endpoints selected from 250 seconds, 400 seconds 500 seconds, 900 seconds, 1000 seconds, 2000 seconds, 3000 seconds, 4000 seconds, and 5000 seconds. For example, $H_2S$ may be detected in 400 seconds to 5000 seconds, 500 seconds to 4000 seconds, or 900 seconds to 3000 seconds.

In any of the foregoing or following embodiments, the FQA also may be able to detect $NH_3$ levels as low as 200 ppb $NH_3$, 100 ppb $NH_3$, or even 50 ppb $NH_3$. $NH_3$ detection generally is slower than CO detection and may be detected in a similar timeframe to $H_2S$. For example, $NH_3$ may be detected in 400 seconds to 5000 seconds, 500 seconds to 4000 seconds, or 900 seconds to 3000 seconds.

In any of the foregoing or following embodiments, the predetermined limit may correspond to a desirable or allowable level of contamination. For example, the predetermined limit may be set to a current output corresponding to a contamination level of 10 ppb to 200 ppb CO, such as a current output corresponding to 10 ppb, 25 ppb, 50 ppb, 75 ppb, 100 ppb, 125 ppb, 150 ppb, 175 ppb, or 200 ppb CO, or any other desirable limit. Alternatively, the predetermined limit may be set to a current output corresponding to a contamination from 1 ppb to 10 ppb $H_2S$, such as a current output corresponding to 1 ppb, 2 ppb, 3 ppb, 4 ppb, 5 ppb, or 10 ppb $H_2S$, or any other desirable limit. In still another example, the predetermined limit may be set to a current output corresponding to a contamination level of 50 ppb to 200 ppb $NH_3$, such as a current output corresponding to 50 ppb, 75 ppb, 100 ppb, 125 ppb, 150 ppb, 175 ppb, or 200 ppb $NH_3$, or any other desirable limit. In some aspects, the current output for the predetermined limit is obtained by flowing a calibration fuel from the impure fuel supply source 670 (FIG. 6) through the FQA. If the current output drops below the predetermined limit, fuel flow through a fuel system may be stopped and/or an alarm, such as a visual and/or audible alarm, may be triggered. In any of the foregoing or following embodiments, the predetermined limit may instead be set as a percentage of the current output in the absence of contamination, e.g., a percentage of the initial current output obtained with clean fuel, such as the fuel provided by the control fuel supply source 660 (FIG. 6), rather than as a specific current output. For example, the predetermined limit may be set as a percentage of a current output corresponding to a clean fuel devoid of impurities. In some embodiments, the predetermined limit is 40%, 50%, 60%, 70%, 75%, 80%, 85%, or 90% of the current output corresponding to the clean fuel.

Figure 7:
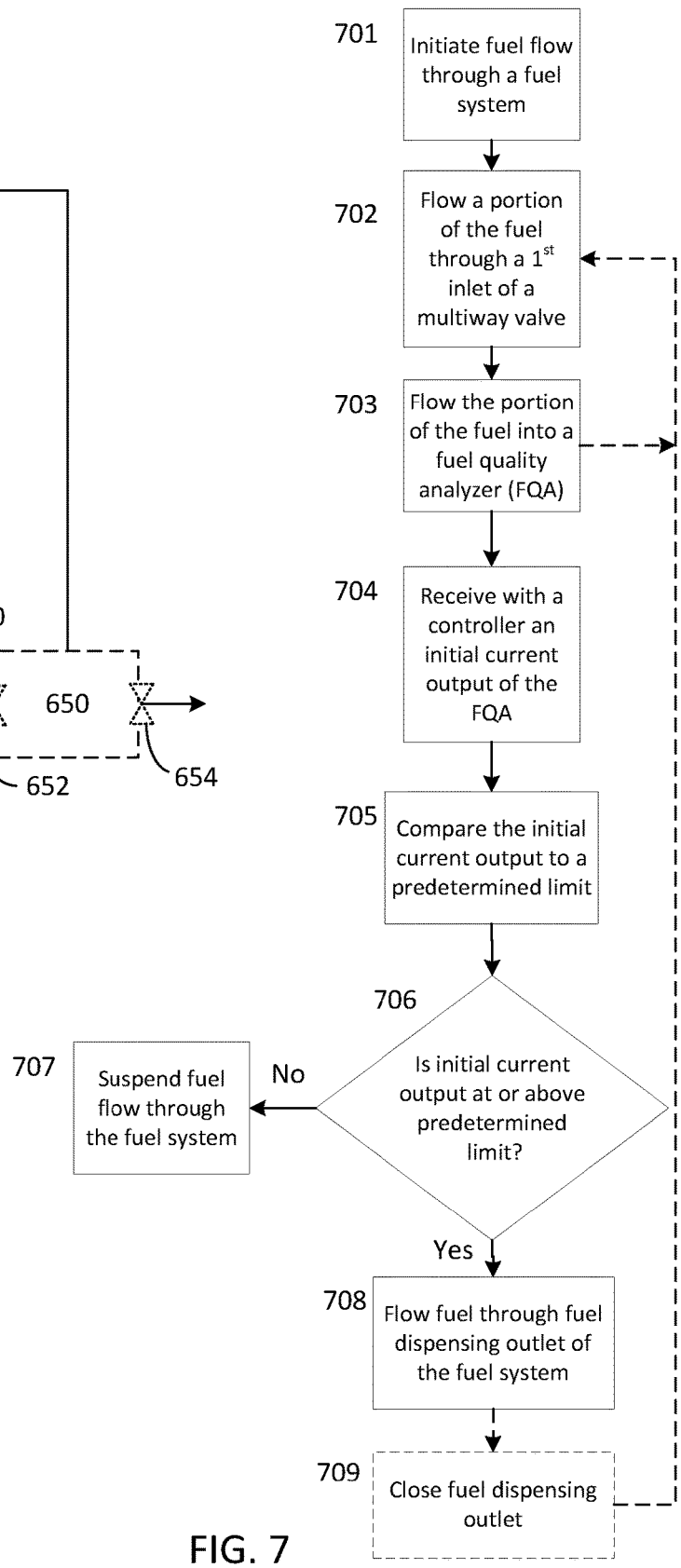
FIG. 7 is a flowchart illustrating one exemplary method of using a fuel contamination detection system.

In one embodiment as illustrated in FIG. 7, the method includes initiating fuel flow through a fuel system comprising a sample take-off valve and a fuel dispensing outlet (step 701). A portion of the fuel subsequently flows through the sample take-off valve and through a first inlet of a multiway valve as disclosed herein, the multiway valve further comprising an outlet fluidly connected to an analyzer as disclosed herein and a second inlet (step 702). The portion of the fuel then flows through the outlet and into the analyzer, the analyzer operated at a first voltage (step 703). The method further includes receiving an initial current output of the analyzer operating at the first voltage (step 704); comparing the initial current output to a predetermined limit (step 705); determining whether the initial current output is at or above the predetermined limit (step 706); and either (i) sending a signal to the fuel system to suspend fuel flow through the fuel dispensing outlet if the initial current output is below the predetermined limit (step 707), or (ii) flowing fuel through the fuel dispensing outlet if the initial current output is at or above the predetermined limit (step 708). Step 704, and optionally steps 705-708, may be performed by a controller as previously described. In some embodiments, the integration time, i.e., the length of time that the portion of the fuel is flowed through the outlet and into the analyzer operated at the first voltage before receiving the initial current output, may range from a few seconds to 2000 seconds, such as a length of time with endpoints selected from 5 seconds, 10 seconds, 50 seconds, 100 seconds, 200 seconds, 500 seconds, 800 seconds, 900 seconds, 1000 seconds, 1500 seconds, and 2000 seconds. For instance, the length of time may be 5 seconds to 2000 seconds, 10 seconds to 1500 seconds, 50 seconds to 1500 seconds, 100 seconds to 1000 seconds, 200 seconds to 1000 seconds, 500 seconds to 1000 seconds, 800 seconds to 1000 seconds, or 800 seconds to 900 seconds. In some implementations, the integration time is inversely proportional to the contamination level, such that a high contamination level may require a much shorter integration time than trace levels of contamination. An initial current output below the predetermined limit indicates that the fuel comprises impurities in an amount exceeding a determined acceptable limit. For example, the predetermined limit may be a current output corresponding to an acceptable limit (SAE J2719 limit) of 200 ppb CO in $H_2$, to an acceptable limit of 4 ppb $H_2S$ in $H_2$, and/or to an acceptable limit of 100 ppb $NH_3$ in $H_2$. In some implementations, a current output drop of >40%, compared to a current output obtained with high-purity $H_2$, indicates a CO contamination level above 200 ppb. An initial current output at or above the predetermined limit indicates that the fuel is sufficiently pure for use, e.g., for refueling hydrogen-powered vehicles.

In any of the foregoing or following embodiments, a flow rate of fuel through the FQA may be from 10 sccm to 400 sccm, such as in a range with endpoints selected from 10 sccm, 25 sccm, 50 sccm, 100 sccm, 150 sccm, 200 sccm, and 250 sccm. In some examples, the flow rate is 10 sccm to 250 sccm, 25 sccm to 200 sccm, 25 sccm to 150 sccm, 50 sccm to 150 sccm, or 100 sccm to 150 sccm. Flow rate impacts response, or integration time, as does the distance between the FCD and the fuel source. For example, if a flow rate of 25 sccm is used and the sample tube is 100 feet (30.5 m) long, then increasing the flow rate to 100 sccm will decrease response time by a factor of 4. In some implementations, the flow rate is 100 sccm. An upper end of the flow rate range is set to ensure sufficient humidification of the internal components of the FQA.

In some embodiments, after fuel dispensing is complete, the FQA is maintained in a functional state by continuing to flow fuel continuously or periodically through the FQA. In some aspects, the fuel is a clean (or maintenance) fuel provided by the control fuel supply source 660 (FIG. 6). In certain implementations, fuel is flowed continuously through the FQA. As shown in FIG. 7, the fuel dispensing outlet may be closed (step 709) when fueling is complete, and the fuel flow or a reduced fuel flow may be continuously or periodically flowed through the first inlet and into the FQA (steps 702, 703). In some embodiments, the reduced fuel flow is continuously flowed through the first inlet and into the FQA.

In the embodiment illustrated in FIG. 7, only one purity check is performed, and the first inlet of the multiway valve is closed if the initial current output is at or above the predetermined limit. In some embodiments, however, it is preferable to continuously or periodically monitor the fuel purity.

Figure 8:
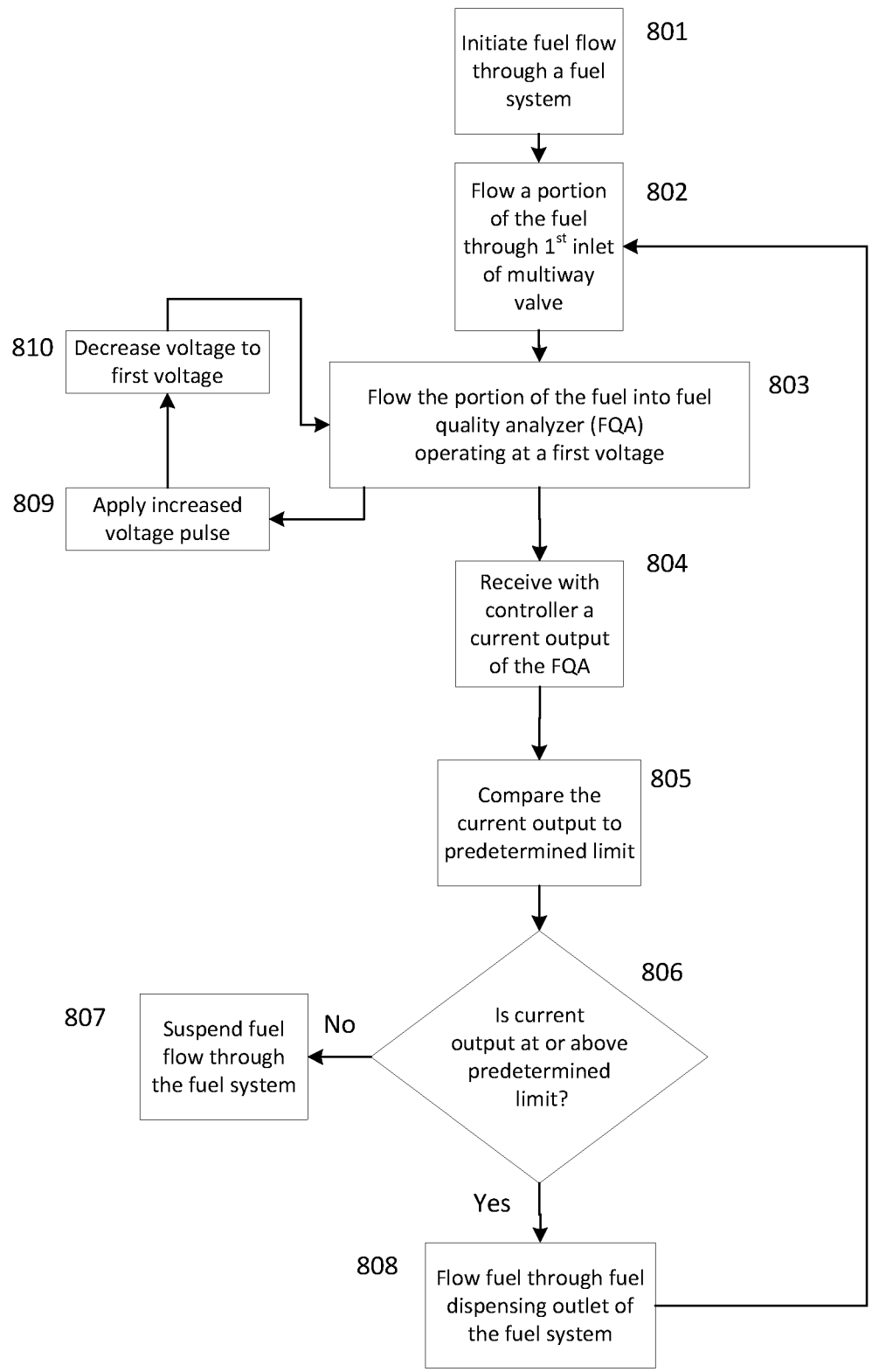
FIG. 8 is a flowchart illustrating another exemplary method of using the fuel contamination detection system.

FIG. 8 illustrates another embodiment of using the FCD where steps 801-808 are as previously described for steps 701-708 of FIG. 7. Step 804, and optionally steps 805-808 may be performed by a controller as previously described. In FIG. 8, as fuel is flowing through the fuel dispensing outlet, the method further includes continuously or periodically repeating steps 802-808 by flowing a portion of the fuel through the first inlet and into the analyzer while flowing fuel through the fuel dispensing system. The current output of the analyzer at the first voltage (for example, +0.08 V to +0.5 V, such as +0.08-0.12 V, or +1.0-1.1 V) is continuously or intermittently received and compared to the predetermined limit. After each comparison, a signal is sent to suspend fuel flow through the fuel dispensing outlet if the current output at the first voltage is below the predetermined limit (step 807). If the current output is at or above the predetermined limit, fuel continues to flow (step 808), and steps 802-808 are repeated until fuel dispensing is complete. In one embodiment, the current output is continuously received and compared. In an independent embodiment, the current output is received and compared intermittently. For example, the current output may be received and compared every 5-5000 seconds, every 5-2000 seconds, every 10-2000 seconds, every 50-1500 seconds, every 100-1500 seconds, every 500-1000 seconds, or every 750-1000 seconds, such as every 5 seconds, every 50 seconds, every 100 seconds, every 250 seconds, every 500 seconds, every 750 seconds, every 800 seconds, every 850 seconds, every 900 seconds, every 1000 seconds, every 2000 seconds, every 3000 seconds, or every 5000 seconds. In certain implementations, the current output may be received and compared every 800-900 seconds. The integration time may be increased if greater resolution is desired to detect lower contamination levels and/or when the contaminants include primarily $H_2S$ or greater amounts of $H_2S$ relative to CO.

Over time, as fuel flows through the FQA, the current output drifts downward significantly as impurities deposit onto the electrodes, even when the impurities are below a permissible level. Thus, it is advantageous to remove the impurities periodically. Different chemical species have different thermodynamic stabilities that are a function of applied electric potential. If the electric potential is exceeded, i.e., by applying a higher voltage to the FQA, the impurities will be removed from the Pt electrodes. Hence, impurities may be removed, and the baseline current output restored, by applying a higher voltage to the FQA.

In some embodiments, a proton pump protocol (PPP) is used wherein the current is maintained at the first voltage for a period of time and then an increased voltage pulse (a cleaning pulse) is applied to the electrodes to remove the impurities. As shown in the exemplary protocol of FIG. 8, an increased voltage pulse is applied to the FQA at periodic intervals (step 809), and the voltage is subsequently decreased to the first voltage (step 810). In any of the foregoing or following embodiments, the first voltage may be +0.08 V to +0.5 V, such as a voltage in a range having endpoints selected from +0.08 V, +0.10 V, +0.12 V, +0.4 V, and +0.50 V, and the increased voltage may be +1.0 V to +1.6 V. In some examples, the first voltage is +0.08 V to +0.5 V, such as +0.08 V to +0.4 V, +0.08 V to +0.25 V, +0.08 V to +0.12 V, or +0.10 V to +0.12 V. In any of the foregoing or following embodiments, the interval, or integration time, between increased voltage pulses may be from 2 seconds to 2000 seconds, such an interval or integration time having endpoints selected from 10 seconds, 20 seconds, 100 seconds, 500 seconds, 750 seconds, 1000 seconds, 1500 seconds, and 2000 seconds. For example, the interval or integration time may be 10 seconds to 2000 seconds, 50 seconds to 1500 seconds, 100 seconds to 1000 seconds, 500 seconds to 1000 seconds or 750 seconds to 1000 seconds. In any of the foregoing or following embodiments, the increased voltage pulse may last from 2 seconds to 90 seconds, such as from 30 seconds to 60 seconds. In one implementation, when the expected contamination level is low (e.g., on the order of 10 ppb), the FQA may be operated at a voltage of 0.1 V for 800-900 seconds, followed by an increased voltage pulse of 1.5 V to +1.6 V for 30 seconds. In another implementation, when the expected contamination level is high (e.g., >100 ppb), the FQA may be operated at a voltage of 0.1 V for a much shorter period of time, such as for 10-20 seconds, followed by an increased voltage pulse of 1.5 V to +1.6 V for 30 seconds.

Figure 9A:
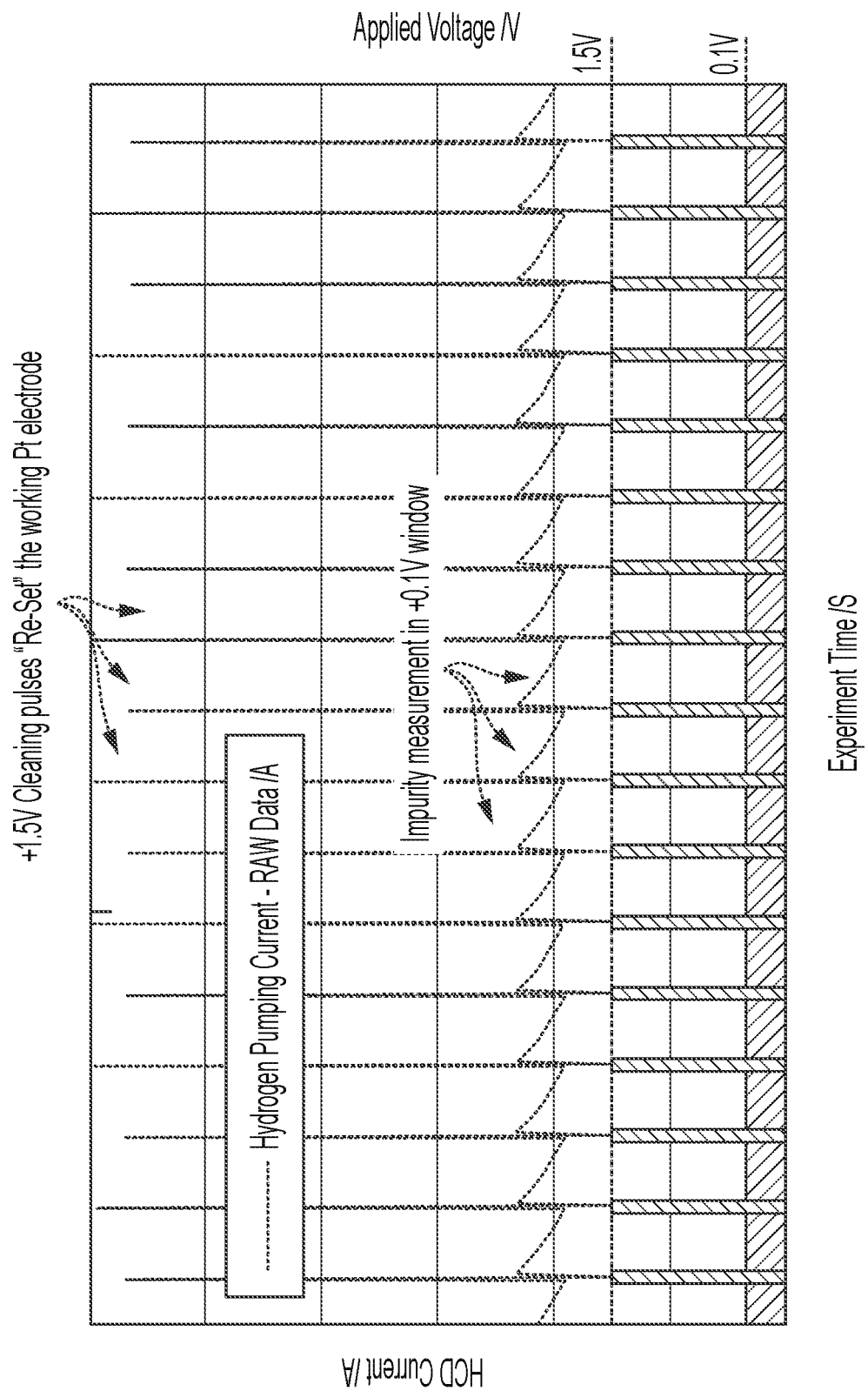
FIGS. 9A and 9B are graphs showing baseline performance of a FQA when the fuel is ultra-high purity hydrogen (99.99999% pure).
Figure 9B:
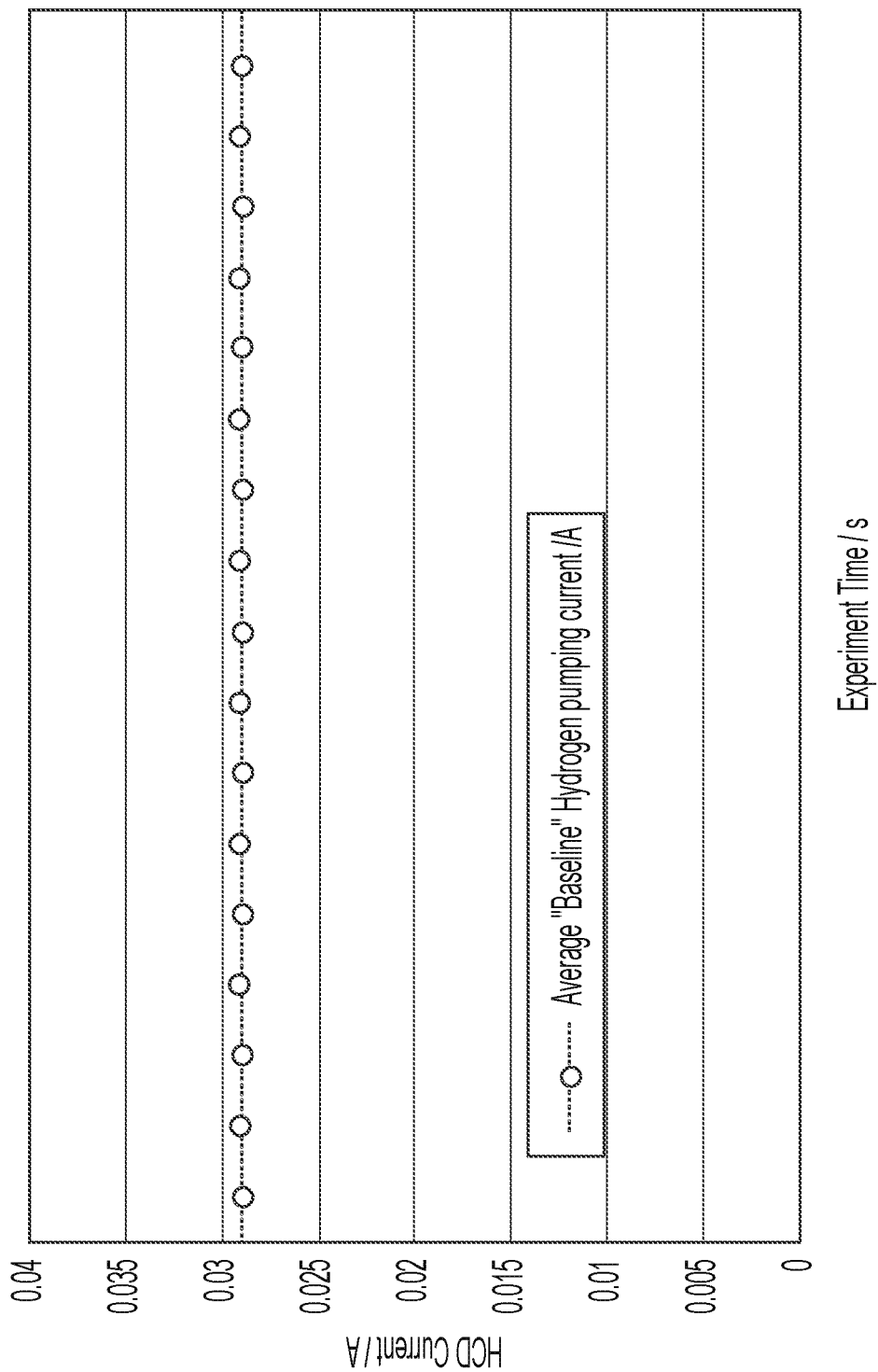
Figure 10A:
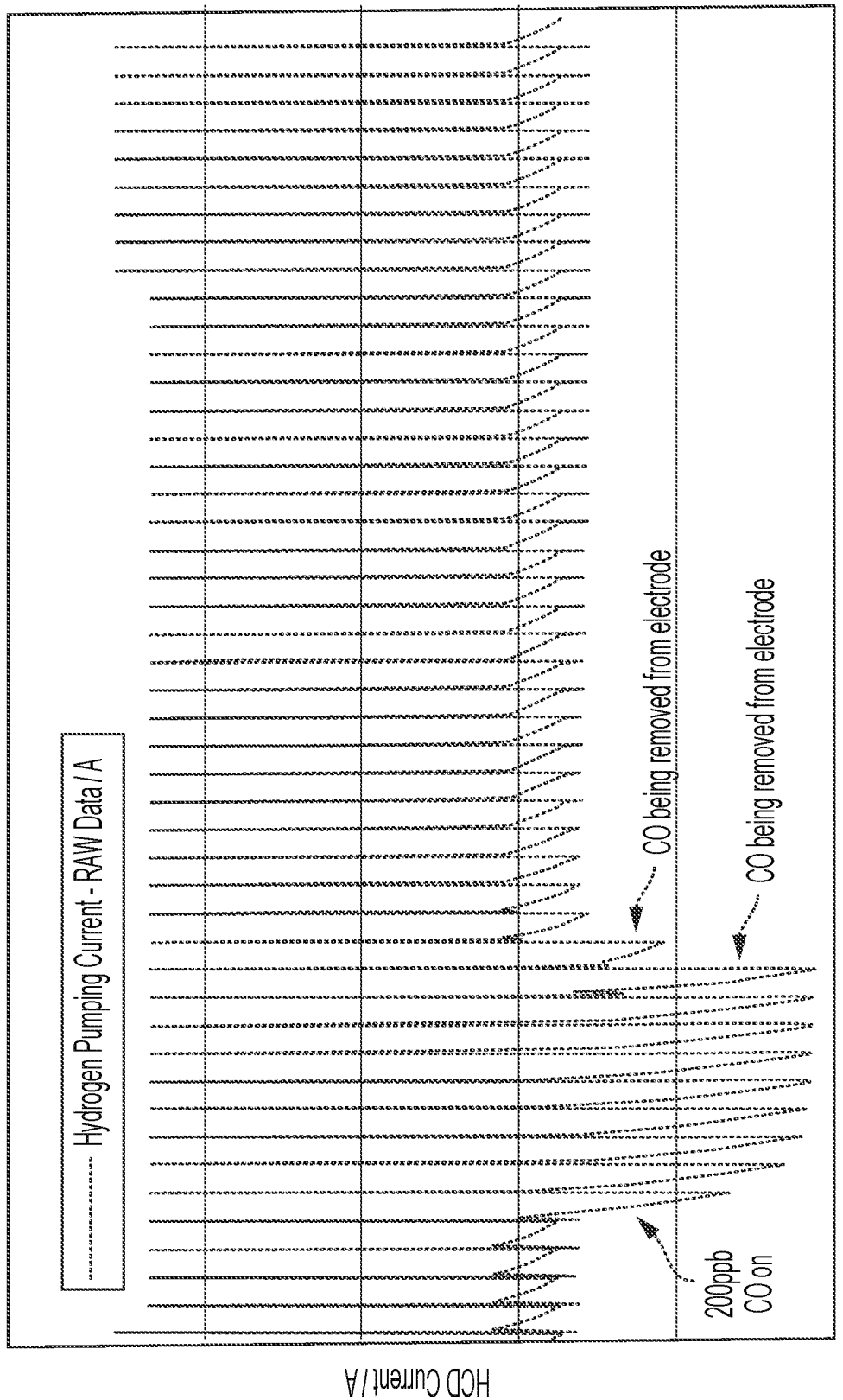
FIGS. 10A and 10B are graphs showing the effect of an impurity on the FQA when the fuel is ultra-high purity hydrogen contaminated with 200 ppb carbon monoxide.
Figure 10B:
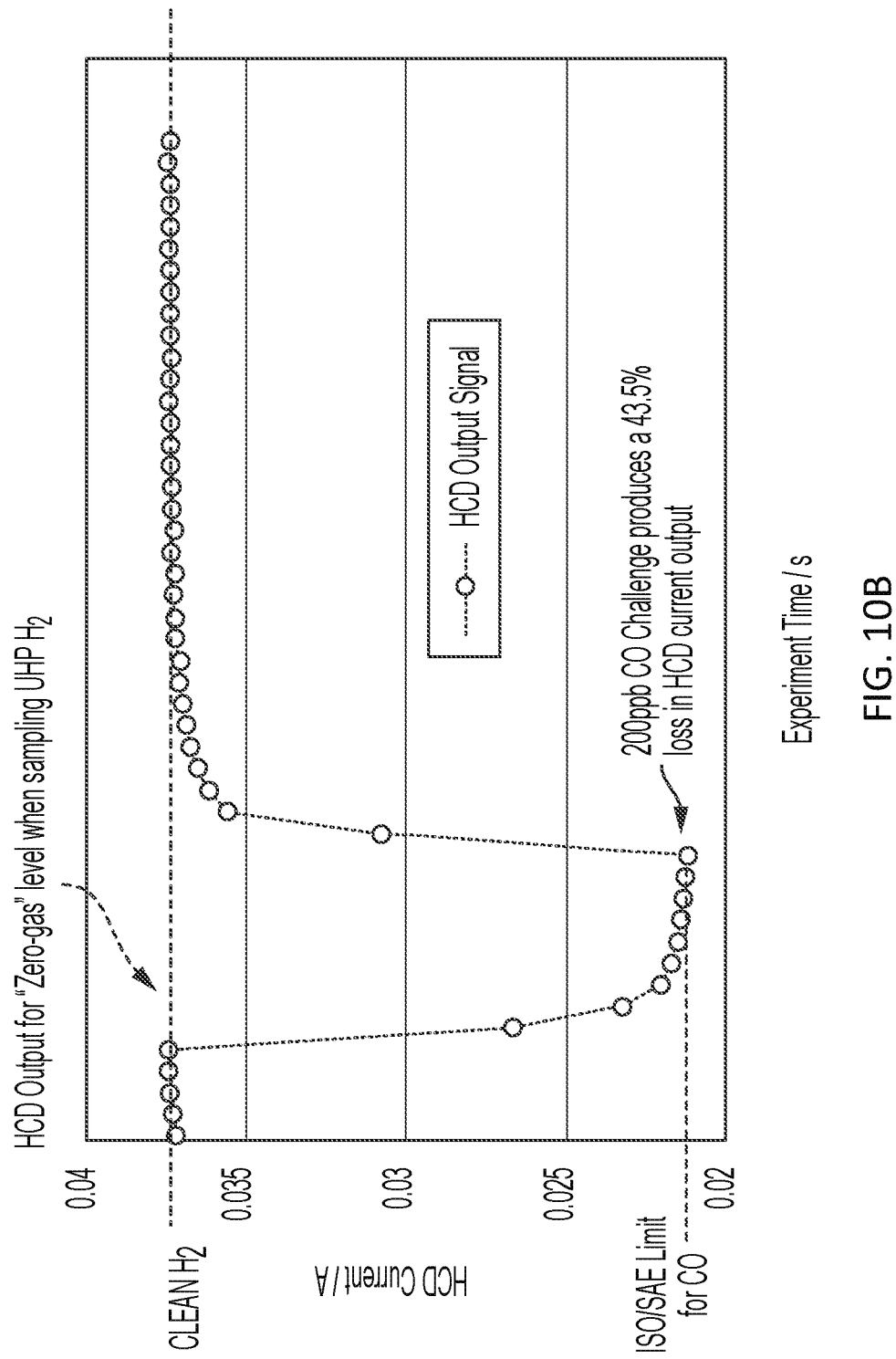

FIGS. 9A and 9B show exemplary current outputs when the fuel is clean. FIG. 9A shows current output from the FQA when cycled with a clean fuel, e.g., ultra-high purity hydrogen. In the example of FIGS. 9A and 9B, fuel is pumped through the FQA with a repeating cycle of a baseline voltage of 0.1 V for 830 seconds followed by a cleaning pulse of 1.5 V for 30 seconds A current output is determined during the 0.1 V portion of each cycle. A plot of the output current taken at 829 seconds and then intermittently every 860 seconds (at the end of each baseline voltage cycle) shows a stable baseline when the fuel is free of contaminants (FIG. 9B). Advantageously, in the absence of impurities, the FQA has a stable average baseline current output that drifts ~0.2 µA/hr, which may be attributable to slow consumption of water from the water reservoir (~250 µL/day). In some implementations, the baseline current output drift may be minimized when the analyzer includes an adjustable-height water reservoir assembly or an external water reservoir/pump arrangement, as previously described. In contrast, when a contaminant (e.g., carbon monoxide) is detected, a sudden and dramatic loss in the current output occurs as shown in FIGS. 10A and 10B (a repeating cycle of a baseline voltage of 0.1 V for 830 seconds followed by a cleaning pulse of 1.5 V to +1.6 V for 30 seconds). The contaminant poisons active catalyst sites on the electrodes, resulting in the current loss.

A measurable current output decrease may occur within seconds when a contaminated fuel flows through the FQA, e.g., within 10-60 seconds, or 30-60 seconds. It is understood that as the contamination level increases, a measurable current decrease is observed in a shorter period of time. In contrast, at low contamination levels, the time to observe a measurable current output decrease may be on the order of 100 s or 1000 s of seconds. In some implementations, detection of even single digit ppb levels of contamination is achieved by detecting a decreased current output after the fuel has flowed through the FQA for an integration period of a few hundred seconds, such as an integration period with endpoints selected from 500 seconds, 700 seconds, 900 seconds, 1000 seconds, 1500 seconds, 3000 seconds, 5000 seconds, and 9000 seconds. For example, the integration period may be 500 seconds to 9000 seconds, 500 seconds to 5000 seconds, 500 seconds to 3000 seconds, 500 seconds to 1500 seconds, 500 seconds to 1000 seconds, or 700 seconds to 900 seconds. The baseline current is restored by the higher voltage cleaning pulses that remove bound contaminants from the active catalyst sites. In some embodiments, when quantifying the contaminant level is desired, several cycles (e.g., at least 3 cycles or at least 5 cycles) are completed to more accurately determine the contaminant level.

Figure 11:
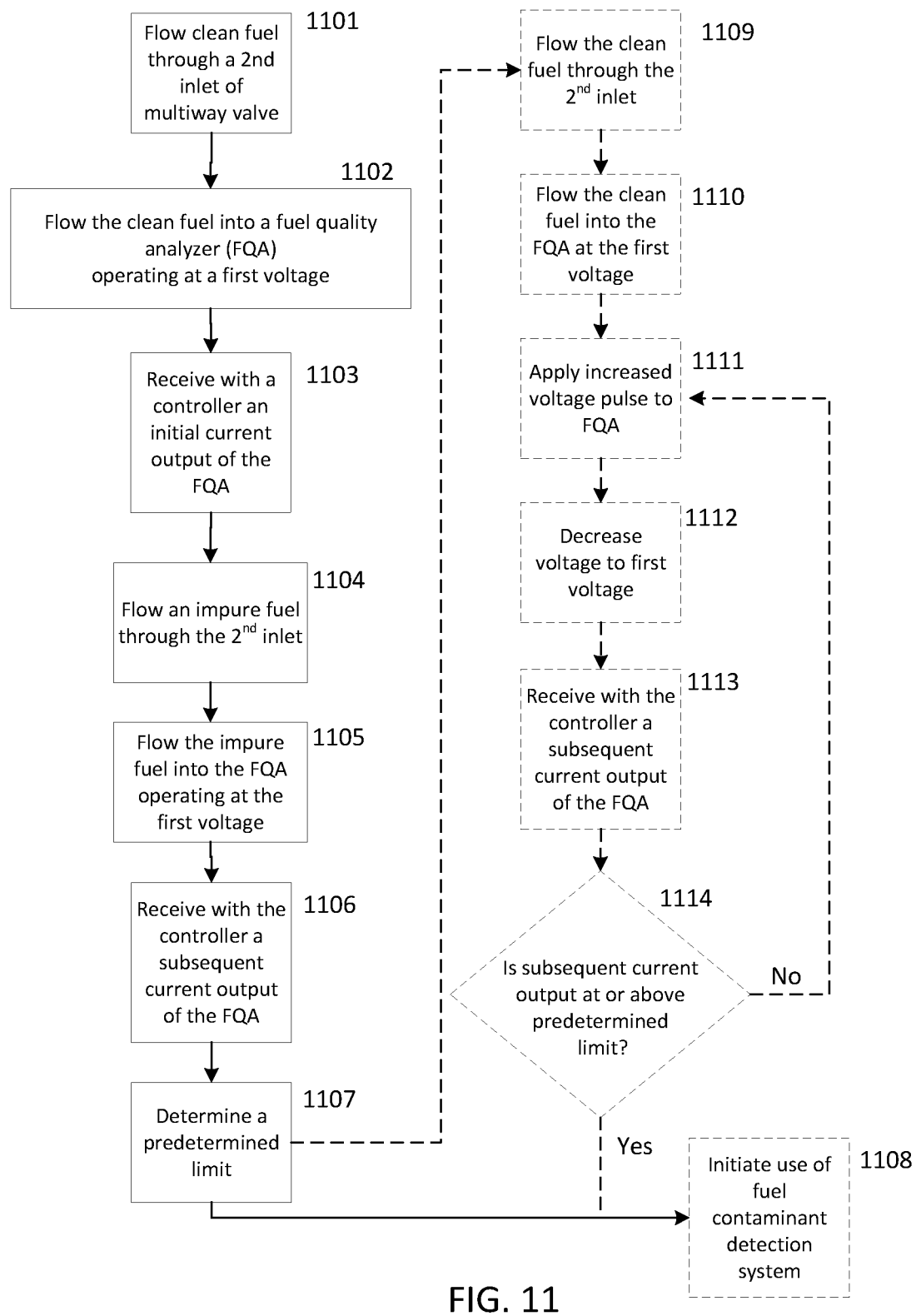
FIG. 11 is a flowchart illustrating an exemplary method of calibrating the fuel contamination detection system.

In any of the foregoing or following embodiments, the FCD may be calibrated prior to use and/or intermittently during use. Because of the multiway valve, the gas flow can readily be switched to a clean fuel (e.g., from the control fuel supply source 660 (FIG. 6)) or a calibration fuel (e.g., from the impure fuel supply source 670 (FIG. 6)) to calibrate the FCD system. Advantageously, embodiments of the disclosed FCD system may exhibit very stable baseline readings. Thus, calibration may be performed at infrequent intervals. In some embodiments, calibration is performed bimonthly, every 3 months, every 6 months, every 12 months, every 18 months, or every 24 months. FIG. 11 illustrates exemplary calibration processes. In the embodiment of FIG. 11, calibration includes flowing a clean fuel (e.g., ultra-high purity hydrogen) through a second inlet of a multiway valve (step 1101). The clean fuel flows into a FQA operating at a first voltage (step 1102). The method further includes receiving with a controller an initial current output of the FQA (step 1103); flowing an impure fuel (e.g., hydrogen with a known impurity concentration) through the second inlet (step 1104) and then into the FQA operating at the first voltage (step 1105); receiving with the controller a subsequent current output of the FQA (step 1106); and determining a predetermined limit for the current output based at least in part on the initial current output with the clean fuel and the subsequent current output with the impure fuel (step 1107). The predetermined limit may be a predetermined current output or a predetermined percentage of the initial current output with the clean fuel. In some embodiments, use of the FCD is initiated (step 1108) after determining the predetermined limit. In other implementations, it is advantageous to first clean the electrodes of the FQA before using the FCD. Thus, after determining the predetermined limit, the method may further include flowing the clean fuel through the second inlet again (step 1109) and then into the FQA operating at the first voltage (step 1110); applying an increased voltage pulse to the FQA (step 1111); operating the analyzer at the first voltage (step 1112); receiving with the controller a subsequent current output of the FQA (step 1113); and determining whether the subsequent current output is at or above the predetermined limit (step 1114). If the subsequent current output is below the predetermined limit, steps 1111-1114 are repeated. If the subsequent current output is at or above the predetermined limit, use of the FCD is initiated (step 1108). In some implementations, calibration comprises flowing a series of impure fuels with differing impurity concentrations through the FQA, as described in FIG. 11, and producing a calibration curve based upon the current outputs or a percentage change in the current outputs (see, also, Examples 2 and 5, and FIGS. 17 and 30).

Figure 12:
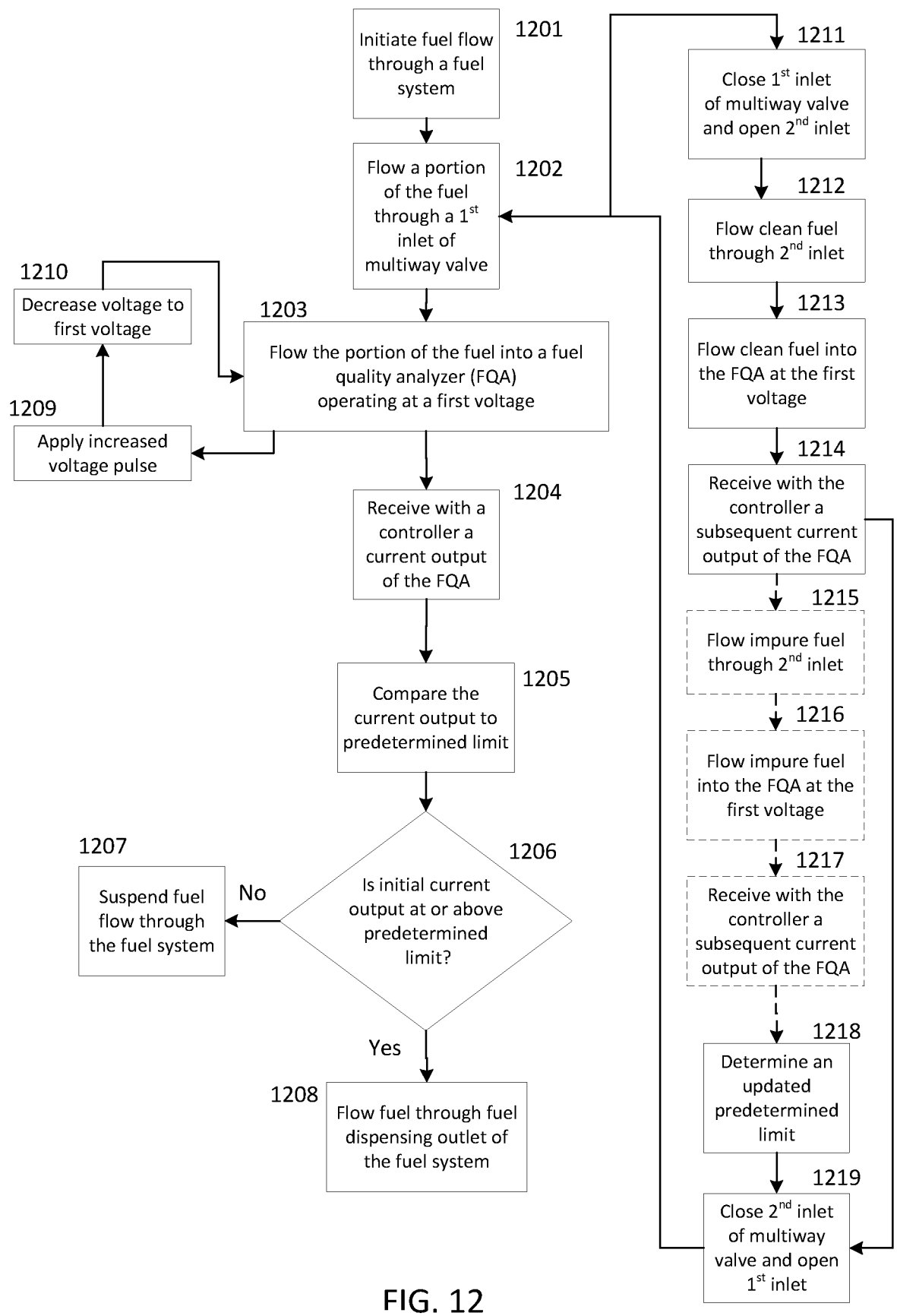
FIG. 12 is a flowchart illustrating an exemplary method of using the fuel contamination detection system with periodic calibration.

FIG. 12 illustrates one exemplary embodiment of a method for performing periodic calibrations during FCD use. Steps 1201-1210 are as previously described for steps 801-810 of FIG. 8. Calibration is performed periodically by closing the first inlet of the multiway valve and opening the second inlet (step 1211); flowing clean fuel through the second inlet (step 1212) and into the FQA operated at the first voltage (step 1213); receiving with the controller a subsequent clean fuel current output of the FQA (step 1214); and determining an updated predetermined limit based at least in part on the initial clean fuel current output from the initial calibration and the subsequent clean fuel current output (step 1218). The predetermined limit may be a predetermined current output or a predetermined percentage of the initial clean fuel current output. After determining the updated predetermined limit, the second inlet is closed and the first inlet is reopened (step 1219), whereby fuel flow through the first inlet may resume (step 1202). In some embodiments, periodic calibrations may further include, after step 1214, flowing an impure fuel through the second inlet (step 1215) and into the FQA operated at the first voltage (step 1216); receiving with the controller a subsequent impure current output of the FQA (step 1217); and determining an updated predetermined limit based at least in part on the initial clean current output, the subsequent clean fuel current output, and the subsequent impure fuel current output (step 1218). Advantageously, the FQA is cleaned after calibrating with an impure fuel as shown in steps 1109-1114 of FIG. 11, e.g., the FQA may be cleaned between steps 1218 and 1219.

In any of the foregoing or following embodiments, opening and closing the first and second inlets 612, 614 of the multiway valve 610 may be performed automatically with a switching device 618, where the controller 620 is electrically coupled to the switching device 618 (FIG. 6). In some embodiments, the switching device 618 may further be operable to switch between flowing clean and impure fuels through the second inlet 614.

In some embodiments, after fuel dispensing is complete, the FQA is maintained in a functional state by continuing to flow fuel continuously or periodically through the FQA. The fuel dispensing outlet may be closed when fueling is complete, and a reduced fuel flow or a clean fuel flow may be continuously or periodically flowed through the first inlet or second inlet, respectively, and into the FQA (not shown). In certain implementations, fuel is flowed continuously through the FQA.

In any of the foregoing or following embodiments, the fuel may comprise impurities, such as carbon monoxide, hydrogen sulfide, ammonia, or any combination of carbon monoxide, hydrogen sulfide, and ammonia. In such embodiments, the method may further comprise determining whether the impurities comprise carbon monoxide, hydrogen sulfide, ammonia, or any combination thereof. Identifying the contaminants may allow an operator to track down and eliminate the contamination source. In some implementations, identifying the impurities is performed by determining the conditions effective to clean the electrodes of the FQA by removing the bound impurities from the electrodes since different contaminants bind to the catalyst sites with different binding energies and may be removed with different cleaning voltage pulses and/or different durations of cleaning pulses. Carbon monoxide is generally easier to remove from the electrodes than hydrogen sulfide and/or ammonia.

Figure 13:
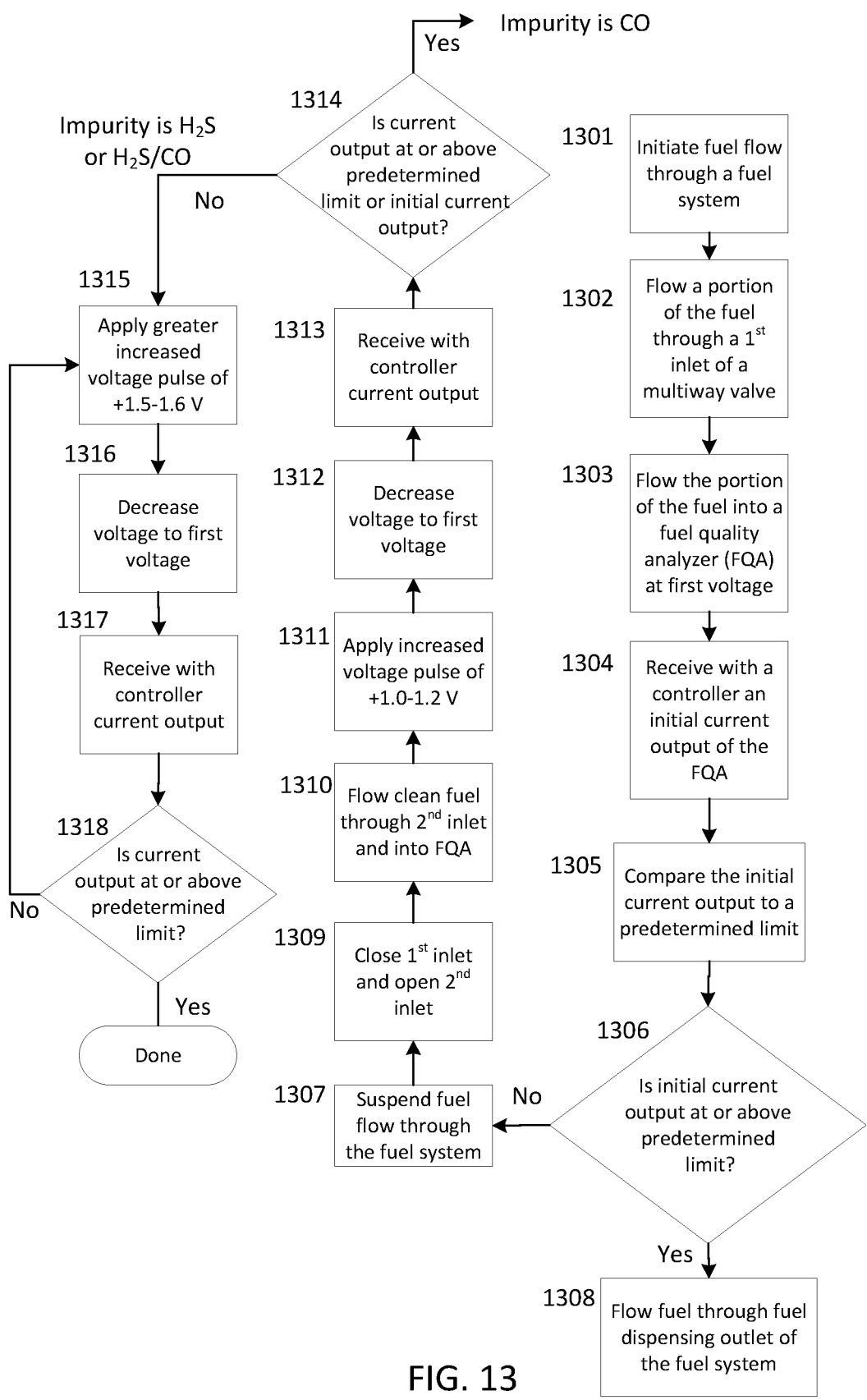
FIG. 13 is a flow chart illustrating an exemplary method for identifying impurities as carbon monoxide and/or hydrogen sulfide.

FIG. 13 illustrates one embodiment of a method for determining the impurity identity. Steps 1301-1308 illustrate a method for using the FCD as previously described with reference to steps 701-708 of FIG. 7. If the initial current output from the fuel is below the predetermined limit, fuel flow through the fuel system is suspended (step 1307). The impurities are determined by: closing the first inlet and opening the second inlet (step 1309), whereby clean fuel flows through the second inlet and into the FQA (step 1310); applying an increased voltage pulse, e.g., +1.0 V to +1.2 V, to the FQA (step 1311) for a period of time (e.g., up to 30 seconds, such as for 5-30 seconds or 10-30 seconds); operating the analyzer at the first voltage (step 1312); receiving with the controller a clean fuel current output at the first voltage (step 1313); and comparing the clean fuel current output to the predetermined limit, the initial current output, or both the predetermined limit and the initial current output (step 1314). If the clean fuel current output is at or above the predetermined limit, the impurity is determined to be carbon monoxide and the process is complete. If the clean fuel current output is below the predetermined limit but greater than the initial current output, the impurity comprises a combination of carbon monoxide and hydrogen sulfide. If the clean fuel current output is below the predetermined limit and the same as the initial current output, the impurity is likely hydrogen sulfide, ammonia, or a combination of hydrogen sulfide and ammonia. In some implementations, steps 1311-1314 may be repeated with step 1311 being performed for a longer period of time, e.g., 80-100 s to confirm the likely identity of the impurity.

If the clean fuel current output is below the predetermined limit and the impurity is hydrogen sulfide, ammonia, or a combination of carbon monoxide with hydrogen sulfide and/or ammonia, the method may further comprise applying a greater increased voltage pulse of +1.5 V to +1.6 V to the FHA while flowing the clean fuel through the FHA (step 1315); subsequently operating the analyzer at the first voltage (step 1316); receiving, with the controller, a subsequent clean fuel current output at the first voltage (step 1317); and comparing the subsequent clean fuel current output to the predetermined limit (step 1318). In some embodiments, the increased voltage pulse of +1.5 V to +1.6V is applied for a time period of 500 seconds to 5000 seconds, such as a time period with endpoints selected from 1000 seconds, 1200 seconds, 1500 seconds, 2000 seconds, 2500 seconds, 3000 seconds, 4000 seconds, and 5000 seconds. For example, the time period may be 1000 seconds to 5000 seconds, 1200 seconds to 4000 seconds, 1500 seconds to 3000 seconds, or 1800 seconds to 2500 seconds. If the subsequent clean fuel current output is less than the predetermined limit, steps 1315-1318 are repeated until the subsequent clean fuel current output is at or above the predetermined limit. In some implementations, in successive repeated cycles, the time period of the increased voltage pulse may be lengthened until the subsequent clean fuel current output is at or above the predetermined limit. In certain implementations when the impurity comprises ammonia, the subsequent current output may not recover and may remain below the predetermined limit. Thus, in some aspects, the impurity may be identified as $H_2S$ or $NH_3$, based on whether the subsequent clean fuel current output recovers after successive repeated cycles, in which case the impurity likely is $H_2S$, or whether the subsequent clean fuel current output does not recover, in which case the impurity likely is $NH_3$.

Figure 14:
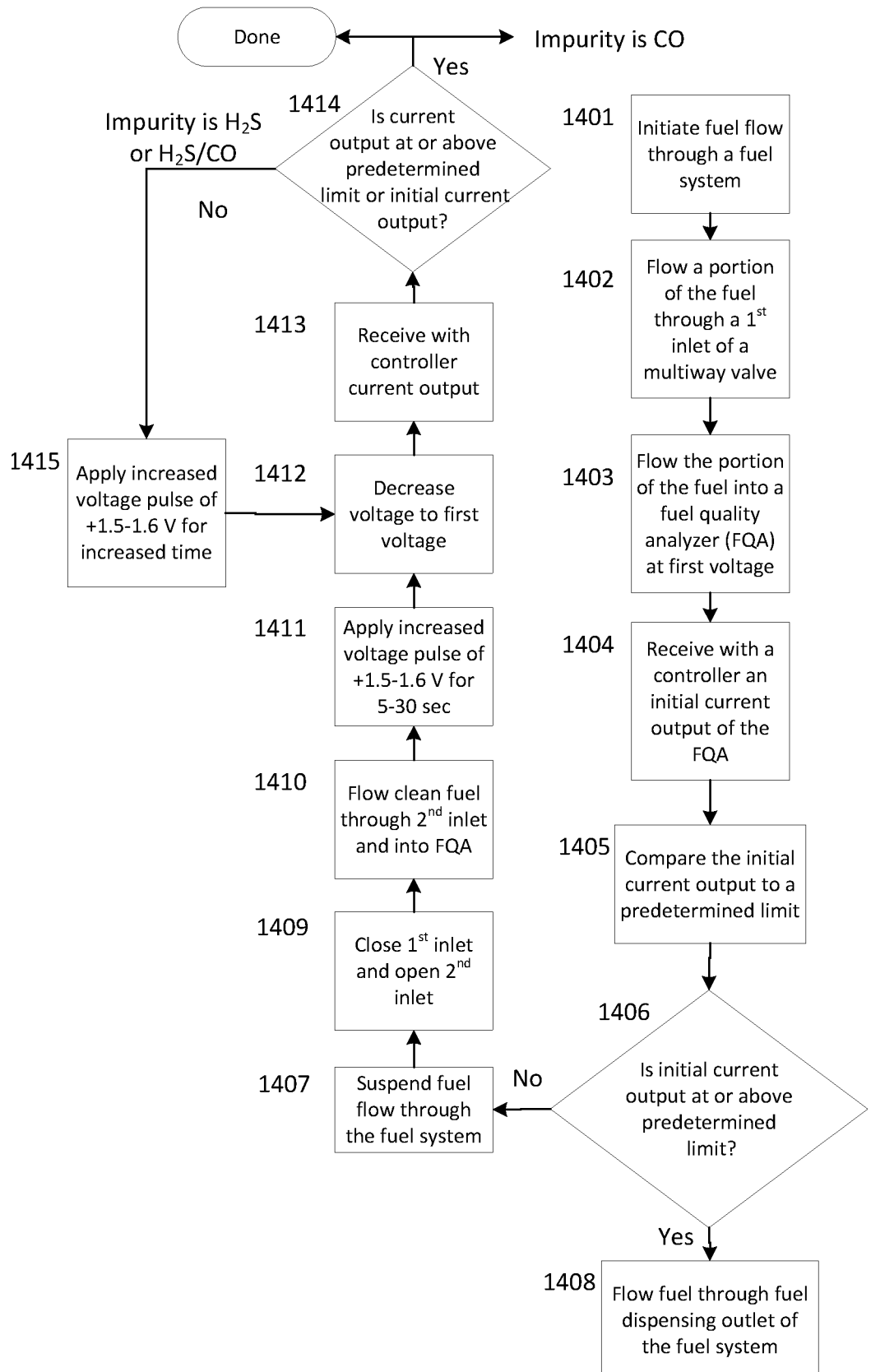
FIG. 14 is a flow chart illustrating another exemplary method for identifying impurities as carbon monoxide and/or hydrogen sulfide.

FIG. 14 illustrates another embodiment of a method for determining the impurity identity. Steps 1401-1408 illustrate a method for using the FCD as previously described with reference to steps 701-708 of FIG. 7. If the initial current output from the fuel is below the predetermined limit, fuel flow through the fuel system is suspended (step 1407). The impurities are determined by: closing the first inlet and opening the second inlet of the multiway valve (step 1409); flowing the clean fuel through the second inlet and into the FHA (step 1410) applying an increased voltage pulse of +1.5 V to +1.6 V to the analyzer for a period of time (e.g., up to 30 seconds, such as for 5-30 seconds or 10-30 seconds) while the clean fuel flows through the outlet and into the FHA (step 1411); subsequently operating the analyzer at the first voltage (step 1412); receiving, with the controller, a clean fuel current output at the first voltage (step 1413); and comparing the clean fuel current output to the predetermined limit, the initial current output, or both the predetermined limit and the initial current output (step 1414). As contaminants are removed from the electrodes during application of the increased voltage pulse, the current output is expected to increase. If the clean fuel current output is at or above the predetermined limit, the impurity is determined to likely be carbon monoxide, and the process is complete. If the clean fuel current output is below the predetermined limit but greater than the initial current output, the impurity comprises a combination of carbon monoxide with hydrogen sulfide and/or ammonia. If the clean fuel current output is below the predetermined limit and the same as the initial current output, the impurity is likely hydrogen sulfide, ammonia, or a combination thereof.

If the clean fuel current output is below the predetermined limit and the impurity is hydrogen sulfide, ammonia, or a combination of carbon monoxide with hydrogen sulfide and/or ammonia, the method may further comprise one or more cycles of applying an increased voltage pulse of +1.5 V to +1.6 V for an increased period of time (step 1415) and repeating steps 1412-1414 until the subsequent clean fuel current output is at or above the predetermined limit. In some embodiments, the time period of step 1415 may be increased in successive subsequent cycles and the rate of current recovery may be used to differentiate $H_2S$ and/or $NH_3$ from CO. For instance, in one non-limiting example, the time period of step 1415 may be greater than 30 seconds to 60 seconds in a first cycle, 600-1000 seconds in a second cycle, and 2000-3000 seconds in a third cycle. It is understood, however, that the number and length of the increased voltage pulses may be varied based upon the contaminant level in the fuel and the likely composition of the contaminant(s). In certain implementations when the impurity comprises ammonia, the subsequent current output may not recover, or may not recover fully, and may remain below the predetermined limit.

IV. Representative Embodiments

Certain representative embodiments are exemplified in the following numbered paragraphs.

1. A system, comprising: (i) a multiway valve comprising a first inlet, a second inlet, and an outlet; (ii) an analyzer fluidly connected to the outlet, the analyzer comprising (a) an anode flow field plate defining a first fuel flow field channel, (b) a cathode flow field plate defining a second fuel flow field channel, (c) a humidified polymer electrolyte membrane between the anode and cathode flow field plates, (d) a first electrode between the anode flow field plate and the humidified polymer electrolyte membrane, the first electrode having a first platinum loading, (e) a second electrode between the cathode flow field plate and the humidified polymer electrolyte membrane, the second electrode having a second platinum loading higher than the first platinum loading, and (f) a reservoir volume defined by the anode and cathode flow field plates and configured to retain water, wherein at least a portion of the humidified polymer electrolyte membrane extends into the reservoir volume, wherein the reservoir volume is separate from each of the first fuel flow field channel and the second fuel flow field channel, and wherein at least one of the first electrode or the second electrode comprises a first portion outside the reservoir volume and aligned with the first fuel flow field channel or the second fuel flow field channel, and a second portion extending into the reservoir volume; and (iii) a controller electrically coupled to the analyzer, the controller configured to receive a current output from the analyzer, compare the current output to a predetermined limit, and send a signal to a fuel dispensing system to suspend fuel flow through the fuel dispensing system if the current output is below the predetermined limit.

2. The system of paragraph 1, wherein the analyzer further comprises: an adjustable-height water reservoir assembly fluidly connected to the reservoir volume; or an external water reservoir fluidly connected to the reservoir volume and a pump operable to pump water from the external water reservoir into the reservoir volume.

3. The system of paragraph 1 or paragraph 2, wherein the controller is further configured to: open and close the first inlet of the multiway valve; and open and close the second inlet of the multiway valve.

4. The system of any one of paragraphs 1-3, wherein the multiway valve further comprises a switching device operable to open and close the first inlet and the second inlet, and the controller is further configured to operate the switching device.

5. The system of any one of paragraphs 1-4, wherein the controller is further configured to increase or decrease an operating voltage of the analyzer.

6. The system of paragraph 5, wherein the controller is configured to periodically increase or decrease the operating voltage at defined time intervals.

7. The system of any one of paragraphs 1-6, further comprising a flow control device between the outlet and the analyzer.

8. The system of any one of paragraphs 1-7, wherein the system is coupled to a fuel dispensing system.

9. The system of paragraph 8, wherein the controller is configured to send signals to the fuel dispensing system to dispense fuel or cease dispensing fuel.

10. The system of any one of paragraphs 1-7, wherein the system is coupled to a fuel production system, a fuel transportation and delivery system, a fuel storage system, or a fuel purification system.

11. A method, comprising: initiating fuel flow through a fuel system comprising a sample take-off valve and fuel dispensing outlet; flowing a portion of the fuel through the sample take-off valve and through a first inlet of a multiway valve, the multiway valve further comprising an outlet fluidly connected to an analyzer and a second inlet; flowing the portion of the fuel through the outlet and into the analyzer, the analyzer operated at a first voltage and comprising (a) an anode flow field plate defining a first fuel flow field channel, (b) a cathode flow field plate defining a second fuel flow field channel, (c) a humidified polymer electrolyte membrane between the anode and cathode flow field plates, (d) a first electrode between the anode flow field plate and the humidified polymer electrolyte membrane, the first electrode having a first platinum loading, (e) a second electrode between the cathode flow field plate and the humidified polymer electrolyte membrane, the second electrode having a second platinum loading higher than the first platinum loading, (f) a reservoir volume defined by the anode and cathode flow field plates and configured to retain water, wherein at least a portion of the humidified polymer electrolyte membrane extends into the reservoir volume, wherein the reservoir volume is separate from each of the first fuel flow field channel and the second fuel flow field channel, and wherein at least one of the first electrode or the second electrode comprises a first portion outside the reservoir volume and aligned with the first fuel flow field channel or the second fuel flow field channel, and a second portion extending into the reservoir volume, and (g) optionally, (i) an adjustable-height water reservoir assembly fluidly connected to the reservoir volume, or (ii) an external water reservoir fluidly connected to the reservoir volume and a pump operable to pump water from the external water reservoir into the reservoir volume; receiving, with a controller electrically coupled to the analyzer, an initial current output of the analyzer operating at the first voltage, the controller further configured to (i) determine a predetermined limit for current output, (ii) compare the initial current output to the predetermined limit, (iii) send a signal to the fuel dispensing system, and (iv) increase or decrease an operating voltage of the analyzer; comparing the initial current output to a predetermined limit; and (i) sending a signal to the fuel system to suspend fuel flow through the fuel dispensing outlet if the initial current output is below the predetermined limit; or (ii) flowing fuel through the fuel dispensing outlet if the initial current output is at or above the predetermined limit.

12. The method of paragraph 11, wherein an initial current output below the predetermined limit indicates that the fuel comprises impurities in an amount exceeding a determined acceptable level.

13. The method of paragraph 11 or paragraph 12, wherein the predetermined limit is a current output corresponding to 200 ppb CO in $H_2$, 4 ppb $H_2S$, or a combination thereof.

14. The method of paragraph 11 or paragraph 12, wherein the predetermined limit is a current output corresponding to a percentage of a current output corresponding to a clean fuel devoid of impurities.

15. The method of any one of paragraphs 11-14, further comprising suspending fuel flow through the fuel dispensing outlet if the initial current output is at or above the predetermined limit.

16. The method of any one of paragraphs 11-15, wherein fuel is flowing through the fuel dispensing system, the method further comprising: continuously flowing a portion of the fuel through the first inlet and into the analyzer while flowing fuel through the fuel dispensing system; continuously or intermittently receiving a current output of the analyzer and comparing the current output at the first voltage to the predetermined limit; and sending a signal to the fuel dispensing system to suspend fuel flow through the fuel dispensing outlet if the current output at the first voltage is below the predetermined limit.

17. The method of any one of paragraphs 11-15, wherein fuel is flowing through the fuel dispensing system, the method further comprising: flowing a portion of the fuel through the first inlet and into the analyzer at periodic intervals while continuously flowing fuel through the fuel dispensing outlet; receiving a current output of the analyzer at the first voltage during the periodic intervals and comparing the current output to the predetermined limit; and sending a signal to the fuel dispensing system to suspend fuel flow through the fuel dispensing outlet if the current output at the first voltage is below the predetermined limit.

18. The method of any one of paragraphs 11-17, further comprising: applying an increased voltage pulse to the analyzer at periodic intervals; and subsequently operating the analyzer at the first voltage.

19. The method of any one of paragraphs 11-18, further comprising calibrating the analyzer prior to flowing the fuel through the first inlet of the multiway valve.

20. The method of paragraph 19, wherein calibrating comprises: closing the first inlet; flowing a clean fuel devoid of impurities through the second inlet and into the analyzer; receiving an initial clean fuel current output, at the first voltage, corresponding to the clean fuel; flowing an impure fuel comprising a known concentration of impurities through the second inlet and into the analyzer; receiving an initial impure fuel current output, at the first voltage, corresponding to the known concentration of impurities; and determining the predetermined limit based at least in part on the initial clean fuel current output and the initial impure fuel current output.

21. The method of paragraph 20, further comprising: after initiating fuel flow through the fuel system, periodically closing the first inlet to stop receiving the fuel and opening the second inlet to begin receiving the clean fuel; flowing the clean fuel through the outlet and into the analyzer; receiving a subsequent clean fuel current output at the first voltage; and determining an updated predetermined limit based at least in part on the initial clean fuel current output and the subsequent clean fuel current output.

22. The method of paragraph 21, further comprising: periodically receiving the impure fuel through the second inlet; flowing the impure fuel through the outlet and into the analyzer; receiving a subsequent impure fuel current output at the first voltage; and determining an updated predetermined limit based at least in part on the initial clean fuel current output, the subsequent clean fuel current output, and the subsequent impure fuel current output.

23. The method of paragraph 22, further comprising: ceasing flow of the impure fuel through the second inlet; flowing the clean fuel through the second inlet; applying an increased voltage pulse to the analyzer while flowing the clean fuel through the outlet and into the analyzer, thereby removing bound impurities from the anode, the cathode, or both; and subsequently operating the analyzer at the first voltage.

24. The method of paragraph 23, further comprising: receiving a clean fuel current output at the first voltage; comparing the clean fuel current output to the updated predetermined limit; and (i) if the clean fuel current output is below the updated predetermined limit, repeating steps of applying the increased voltage pulse to the analyzer, subsequently operating the analyzer at the first voltage, receiving a clean fuel current output at the first voltage, and comparing the clean fuel current output to the updated predetermined limit; or (ii) if the clean fuel current output is at or above the updated predetermined limit, flowing fuel through the outlet of the fuel dispensing system.

25. The method of paragraph 21, paragraph 23, or paragraph 24, further comprising subsequently closing the second inlet to stop receiving the clean fuel and opening the first inlet to resume receiving the fuel.

26. The method of any one of paragraphs 20-25, wherein the multiway valve comprises a switching device controlled by the controller, the switching device operable to open and close the first inlet and the second inlet.

27. The method of paragraph 26, wherein the switching device is further operable to switch between receiving the clean fuel and the impure fuel through the second inlet.

28. The method of any one of paragraphs 11-27, further comprising: after flowing an amount of fuel through the fuel dispensing outlet, closing the fuel dispensing outlet; and flowing the fuel through the first inlet, or flowing a clean fuel devoid of impurities through the second inlet, and through the outlet of the multiway valve into the analyzer continuously or at periodic intervals while the fuel dispensing outlet is closed.

29. The method of any one of paragraphs 20-28, wherein the clean fuel devoid of impurities is hydrogen.

30. The method of any one of paragraphs 11-29, wherein the fuel comprises hydrogen.

31. The method of any one of paragraphs 11-30, wherein (i) the first voltage is +0.08 V to +0.5 V; (ii) the increased voltage is +1.0 V to +1.6 V; or (iii) both (i) and (ii).

32. The method of any one of paragraphs 11-31, wherein the impurities comprise carbon monoxide, hydrogen sulfide, or a combination thereof.

33. The method of paragraph 32, further comprising determining whether the impurities comprise carbon monoxide, hydrogen sulfide, or carbon monoxide and hydrogen sulfide.

34. The method of paragraph 33, wherein determining comprises: while flowing fuel through the outlet and into the analyzer operating at the first voltage, receiving, with the controller, a fuel current output that is below the predetermined limit; ceasing flow of the fuel through the first inlet; flowing the clean fuel through the second inlet; applying an increased voltage pulse of +1.0 V to +1.2 V to the analyzer while flowing the clean fuel through the outlet and into the analyzer; subsequently operating the analyzer at the first voltage; receiving, with the controller, a clean fuel current output at the first voltage; and comparing the clean fuel current output to the predetermined limit, the fuel current output, or both the predetermined limit and the fuel current output, wherein (i) if the clean fuel current output is at or above the predetermined limit, the impurity is determined to be carbon monoxide; or (ii) if the clean fuel current output is below the predetermined limit but greater than the fuel current output, the impurity comprises a combination of carbon monoxide and hydrogen sulfide; or (iii) if the clean fuel current output is below the predetermined limit and the same as the fuel current output, the impurity is hydrogen sulfide.

35. The method of paragraph 34, wherein if the clean fuel current output is below the predetermined limit, the method further comprises: (i) applying an increased voltage pulse of +1.5 V to +1.6 V to the analyzer while flowing the clean fuel through the outlet and into the analyzer; (ii) subsequently operating the analyzer at the first voltage; (iii) receiving, with the controller, a subsequent clean fuel current output at the first voltage; and (iv) comparing the subsequent clean fuel current output to the predetermined limit, wherein if the subsequent clean fuel current output is less than the predetermined limit, steps (i)-(iv) are repeated until the subsequent clean fuel current output is at or above the predetermined limit.

36. The method of paragraph 33, wherein determining comprises: while flowing fuel through the outlet and into the analyzer operating at the first voltage, receiving, with the controller, a fuel current output that is below the predetermined limit; ceasing flow of the fuel through the first inlet; flowing the clean fuel through the second inlet; applying an increased voltage pulse of +1.5 V to +1.6 V to the analyzer for 10-30 seconds while flowing the clean fuel through the outlet and into the analyzer; subsequently operating the analyzer at the first voltage; receiving, with the controller, a clean fuel current output at the first voltage; and comparing the clean fuel current output to the predetermined limit, the fuel current output, or both the predetermined limit and the fuel current output, wherein (i) if the clean fuel current output is at or above the predetermined limit, the impurity is determined to be carbon monoxide; or (ii) if the clean fuel current output is below the predetermined limit but greater than the fuel current output, the impurity comprises a combination of carbon monoxide and hydrogen sulfide; or (iii) if the clean fuel current output is below the predetermined limit and the same as the fuel current output, the impurity is hydrogen sulfide.

37. The method of paragraph 36, wherein if the clean fuel current output is below the predetermined limit, the method further comprises: (i) applying a subsequent increased voltage pulse of +1.5 V to +1.6 V to the analyzer for a subsequent period of time while flowing the clean fuel through the outlet and into the analyzer, wherein the subsequent period of time is greater than 30 seconds; (ii) subsequently operating the analyzer at the first voltage; (iii) receiving, with the controller, a subsequent clean fuel current output at the first voltage; and (iv) comparing the subsequent clean fuel current output to the predetermined limit, wherein if the subsequent clean fuel current output is less than the predetermined limit, steps (i)-(iv) are repeated until the subsequent clean fuel current output is at or above the predetermined limit.

38. The method of paragraph 37, wherein the subsequent period of time is increased each time step (i) is repeated.

V. EXAMPLES

Example 1

Carbon Monoxide Detection Downstream from a Methane-Steam Reformer System

Using a fuel quality analyzer as disclosed herein, data was collected at a hydrogen filling station during restart of a methane-steam reformer system. It is normal for a steam-methane reformer, used for producing the saleable hydrogen gas, to produce a large amount of carbon monoxide before the system reaches optimum efficiency and before the filtration system (typically a pressure swing absorption system or PSA) achieves optimum scrubbing performance. Ideally, hydrogen gas produced at the refueling station is only compressed and stored after there is confirmation that the required hydrogen purity has been achieved.

A fuel quality analyzer was located on the station's reformer manifold skid inside a refrigerated enclosure already situated on the skid to house the station's nondispersive infrared (NDIR) CO analyzer. The NDIR analyzer was the only form of technology used to monitor the quality of the hydrogen exiting the reformer, after the pressure-swing-adsorption system was used, in order to prevent CO contamination from entering the on-site storage tanks. Production gas sample from the reformer was tapped into and a 0.25 in dia. stainless steel line was added to carry gas sample to an MKS mass flow controller used to maintain a constant 100 sccm flow to the FQA. The exhaust leaving the FQA was tied into one of the station's vent lines. A Gamry Reference 600$^+$ potentiostat was used to control hydrogen pumping currents and to periodically perform electrochemical experiments such as electrochemical impedance spectroscopy and to determine membrane conductivity while in the field. Most field tests and on-site experiments were performed remotely using an internet IP connection and a remote desktop application. In addition to the FQA and potentiostat, a control system was also built and installed on-site that was used to monitor pressures of zero-gas, challenge gas, and sample pressure from the station reformer output, log temperatures both of the FQA and ambient, an automatic valve switching system to switch between station gas, zero-gas high purity $H_2$, and certified $H_2/CO$ mixtures of various concentrations to simulate CO contamination. An off the shelf Omega CN76000 controller was used to monitor and maintain isothermal hydrogen contaminant detector (HCD) temperature at 30° C. using 115V stick heater cartridge inserted into the end-plates of the FQA.

Over a 6-month timeframe, periodic baseline data were collected and the flow control module which directed the sample gas from zero-gas (Research Grade 99.9999% UHP $H_2$), challenge gas (10 ppm or 1 ppm CO in $H_2$ balance), or to station storage hydrogen was tested. Initially 10 ppm CO challenges were performed to test FCD and control systems during installation. The operator changed the challenge bottle to 1 ppm $CO/H_2$ balance in midway through the trial. Over the course of the trial, the baseline was periodically monitored for gross drift (none was ever observed) and periodically, the FQA was tested with 1 ppm $CO/H_2$ balance challenge gas to verify function testing.

Figure 15:
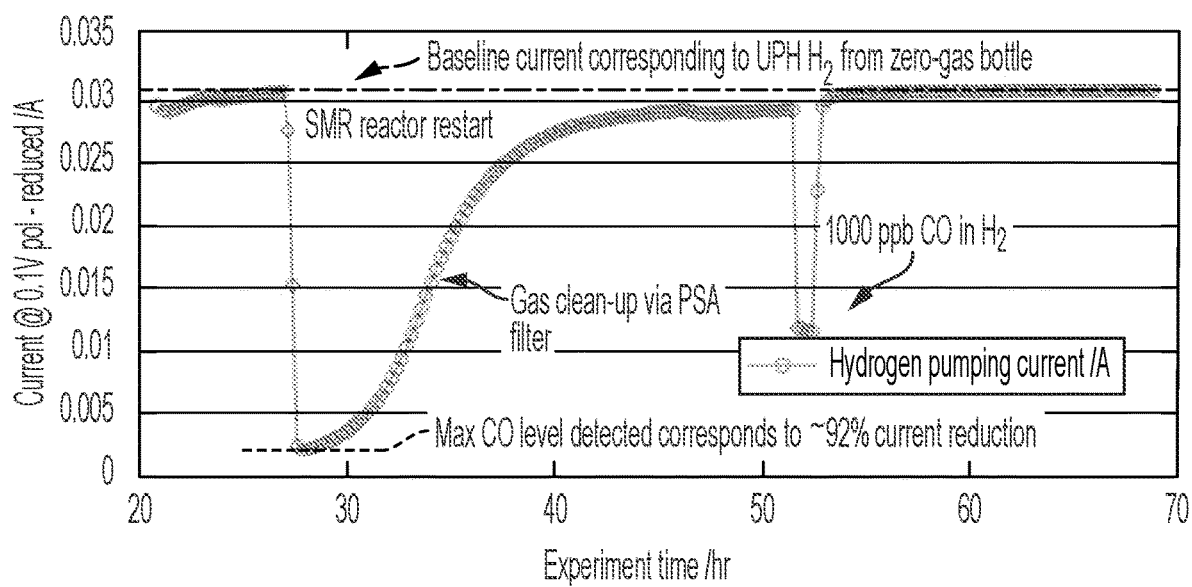
FIG. 15 is a graph of current output from a FQA sampling gas downstream from a steam-methane reformer immediately after start-up and during a calibration challenge with 1 ppm CO.

The station conducted a reformer restart to make hydrogen to test the station's systems, compressor and dispenser upgrades and safety systems. The FQA sampled the bottled research grade $H_2$ until a few minutes after reformer restart and after the product gas built up pressure sufficient to allow a 100 sccm flow of sample gas to the FQA at which point the automatic sampling valve switched from the zero-gas to station's "product gas." The data in FIG. 15 captured the large release of CO primarily from components within the reformer system such as the catalyst bed not at optimum temperature and the pressure swing absorber (PSA) system not yet performing at optimum levels. This is typical start-up behavior for reformer-based production systems and normally this dirty hydrogen would be dumped to the station's venting system until the NDIR reported acceptable levels of CO. FIG. 15 shows that the FQA experienced a large drop in hydrogen pumping current followed by a slow rise over the next day. At about 53.33 hr, the gas was switched from station product gas to the bottle of 1 ppm CO/balance ultra-high purity (UHP) $H_2$ "challenge gas" for approximately 1 hour. Qualitatively, the large drop FQA pumping current compared to just prior the challenge is an indication that the station was producing hydrogen with CO level much lower than 1 ppm. After the CO challenge was terminated, the FQA was switched back to the station product gas stream and the FQA current showed that the remaining CO in the product stream was scrubbed from the product stream by the "clean-up" PSA filtration process. Comparison of the FQA pumping current while sampling the station gas from the reformer to the pumping current level observed using the zero-gas, research-grade UHP $H_2$, permitted the operator to confirm hydrogen purity by comparison to the pumping current using research grade $H_2$ (99.9999%). The FQA data in FIG. 15 clearly showed that ~27.5 hr were necessary after re-starting to the reformer for the PSA system to clean the hydrogen being produced onsite to be equal or better than 99.99999% pure.

Example 2

Long-Term Field Testing

Figure 16:
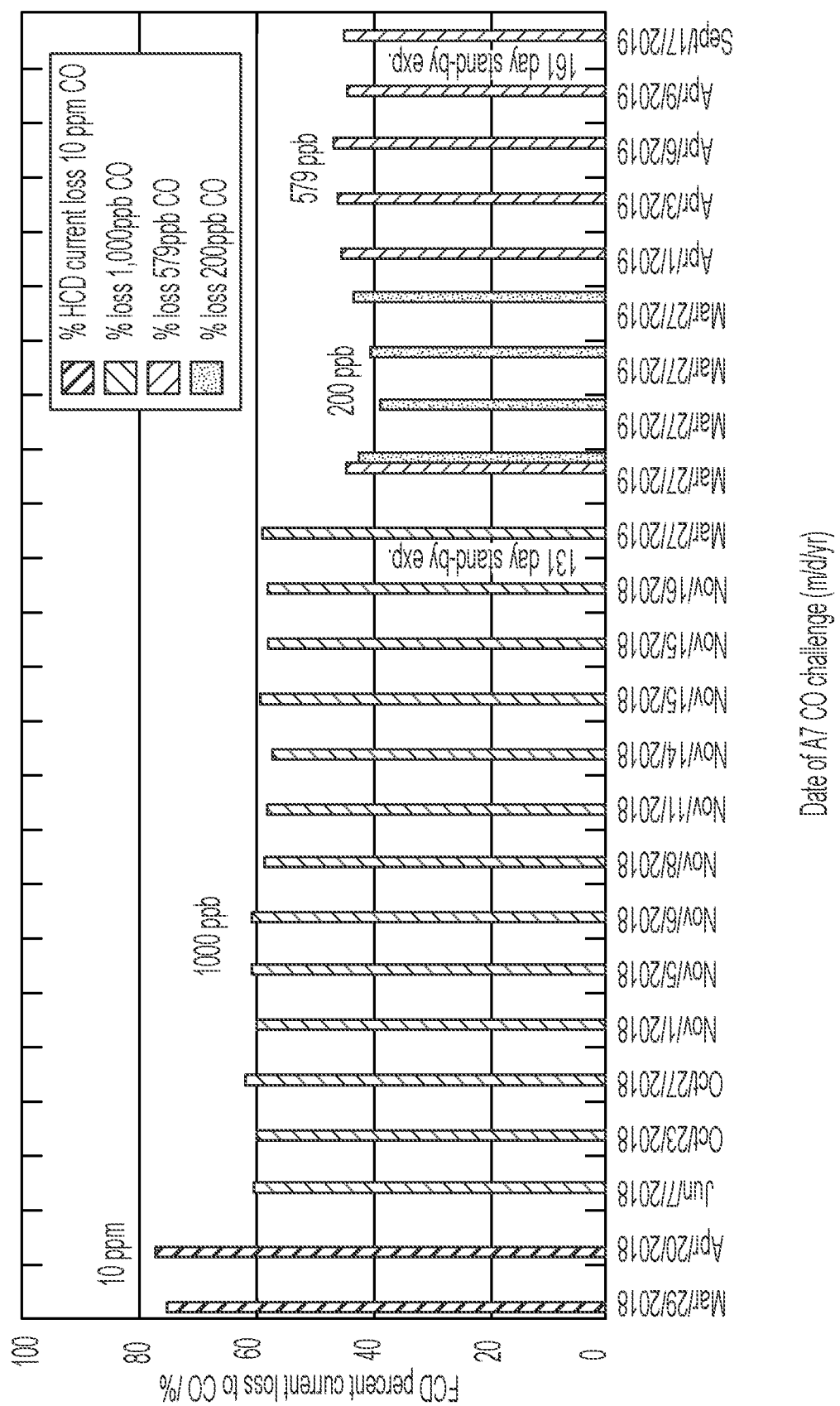
FIG. 16 is a bar graph showing percent current loss when flowing hydrogen containing varying amounts of CO through a FQA.
Figure 17:
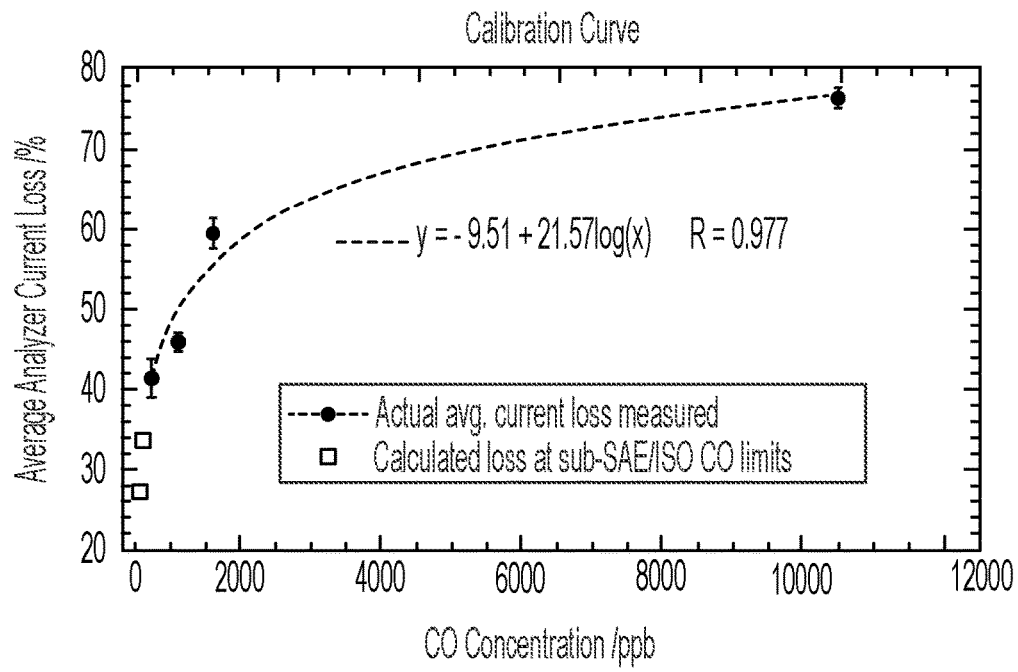
FIG. 17 is a calibration curve relating average current loss to CO concentration in hydrogen gas; the error bars show the data spread.

An 18-month challenge evaluation was performed using $H_2$ with CO impurity levels ranging from 200 ppb to 10 ppm CO. Since by definition, the occurrence of CO in a filling station's product gas would be an undesirable and unacceptable situation, and not be considered normal, the FQA response (accuracy, reproducibility, sensitivity, etc.) was tested periodically using bottles of challenge gas (1 ppm CO, and subsequently lower concentrations of 579 ppb and 200 ppb) connected to the field test experiment control module. A total of 13 individual 1 ppm CO challenges (1 ppm CO/balance UHP $H_2$) were performed over a 9-month period in order to prove FQA reproducibility and stability. At the end of the trial, a special custom blend of 200 ppb $CO/H_2$ balance (e.g., the SAE J2719 and ISO 14687-2 limit) was connected to the FQA field test system to verify the FQA was capable of producing a strong and unmistakable response to the limit of 200 ppb outside controlled laboratory conditions. The 200 ppb $CO/H_2$ challenge bottle was diluted from a certified 600 ppb CO/balance UHP $H_2$ bottle. Since this blend was uncertified but traceable to NIST standards, for the remaining 6 months of field testing, a bottle of certified 579 ppb $CO/H_2$ balance gas was used. The results are shown in FIG. 16, and a calibration curve relating average current loss to CO concentration was generated from these data (FIG. 17). Because the FQA functions on electrochemical principles, the relationship between current loss and CO concentration is logarithmic. The data demonstrated that:

1) The current loss percentage was proportional to the CO concentration.
2) The FQA easily responded to the SAE J2719 200 ppb CO limit by exhibiting an average of 41.4±2.1% current drop from the zero-gas current.
3) On two separate occasions, the FQA was put into hibernation mode after a period of time of continuous operation, first for 131 days and then another hibernation was conducted for 161 days. 1 ppm CO challenges were performed before and after the first hibernation experiment and 579 ppb CO challenges were performed before and after the 161-day hibernation experiment. The current loss for both test challenges fell within the spread of all percentage losses recorded for 1 ppm and 597 ppb respectively despite the long periods of inactivity.
4) The FQA exhibited a stable baseline with negligible drift over 6 months.
5) A calibration curve may be used to convert measured percent current loss to concentration of CO in the sample gas. The station operator may elect to use the FQA to warn if a CO level is exceeded (i.e., the pumping current falls below a certain % of baseline current measure using pure, zero-gas $H_2$), or use a calibration curve to calculate the CO concentration in real time.
6) The calibration curve R value of 0.977 (FIG. 17), including two hibernation periods totaling 192 days, clearly demonstrates that the FQA is intrinsically stable and exhibited very little drift over the full 18 months of the field test.

Figure 18:
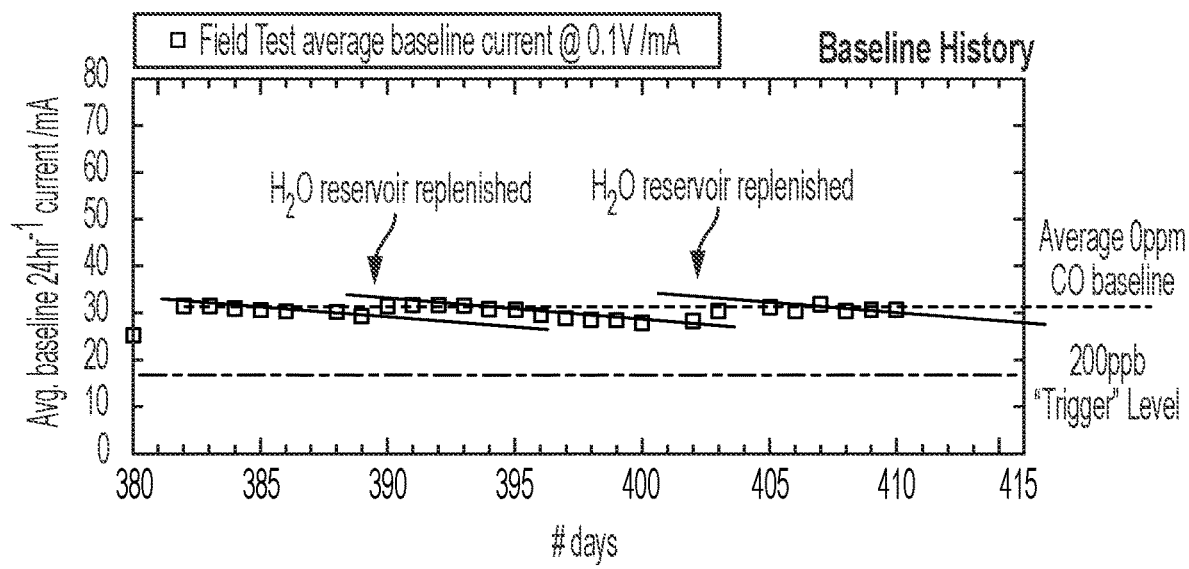
FIG. 18 is an expanded graph showing that water evaporation from the FQA reservoir has only a minor effect on the baseline current output.

As shown in the expanded view of FIG. 18 (each data point=24-hour period), a minor continuous baseline drift occurred as the water reservoir was depleted. The baseline returned to the average value when the water reservoir was replenished. The drift was not sufficient to provide a false positive or false negative result from the FQA.

Example 3

Multiway Valve for Switching Between Reference Gas and Fuel

Figure 19:
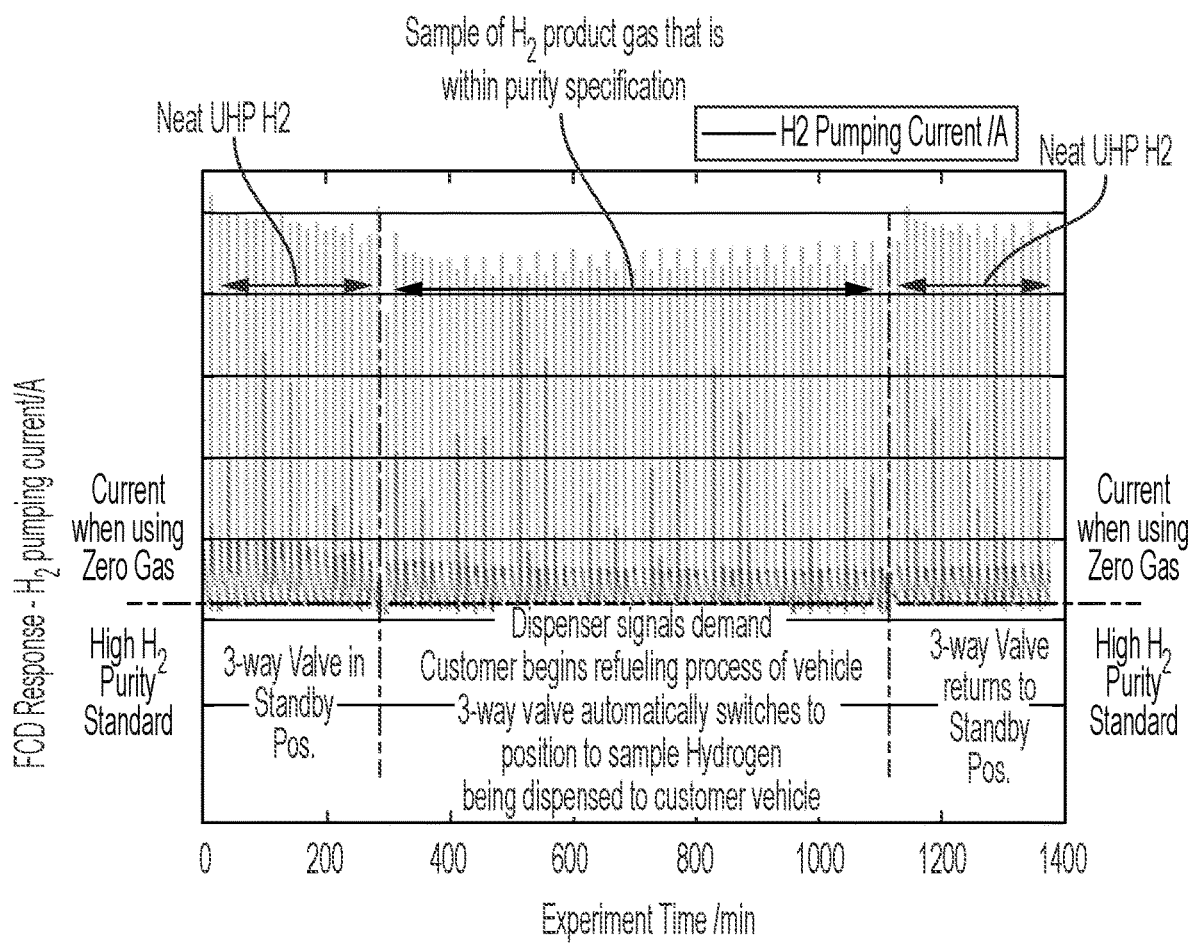
FIG. 19 is a graph showing current output from a FQA sampling pure hydrogen (99.9999%) from a reference bottle, followed by sampling hydrogen from a fueling station, and then returning to sampling pure hydrogen (99.9999%) from a reference bottle.

A fuel quality analyzer as disclosed herein was connected to a 3-way sampling valve so that high purity hydrogen (99.9999%) from a reference bottle or fuel from a hydrogen refueling station could be flowed through the FQA. Initially the FQA sampled the zero-gas continuously for several hours using a standard polarization protocol where the 0.1V was applied to measure pumping current and periodically, a voltage pulse of 1.5V was applied to remove contaminants from the working electrode and "reset" the FQA, or restore the performance to pre-contamination conditions after exposure to the calibration gas or a challenge test with impure gas. The pulsing current behavior is shown in FIG. 19. At the time indicated by the vertical dashed black line, the sampling valve was switched to the refueling hydrogen. There was no change in the FQA current when the gas switched back-and-forth between the high-purity gas and the refueling hydrogen because the refueling hydrogen was as pure as the hydrogen contained in the zero-gas bottle, as shown by the horizontal dotted lines indicating the current data points just prior to the clean-up pulses. The refueling hydrogen was therefore "within specifications."

Figure 20:
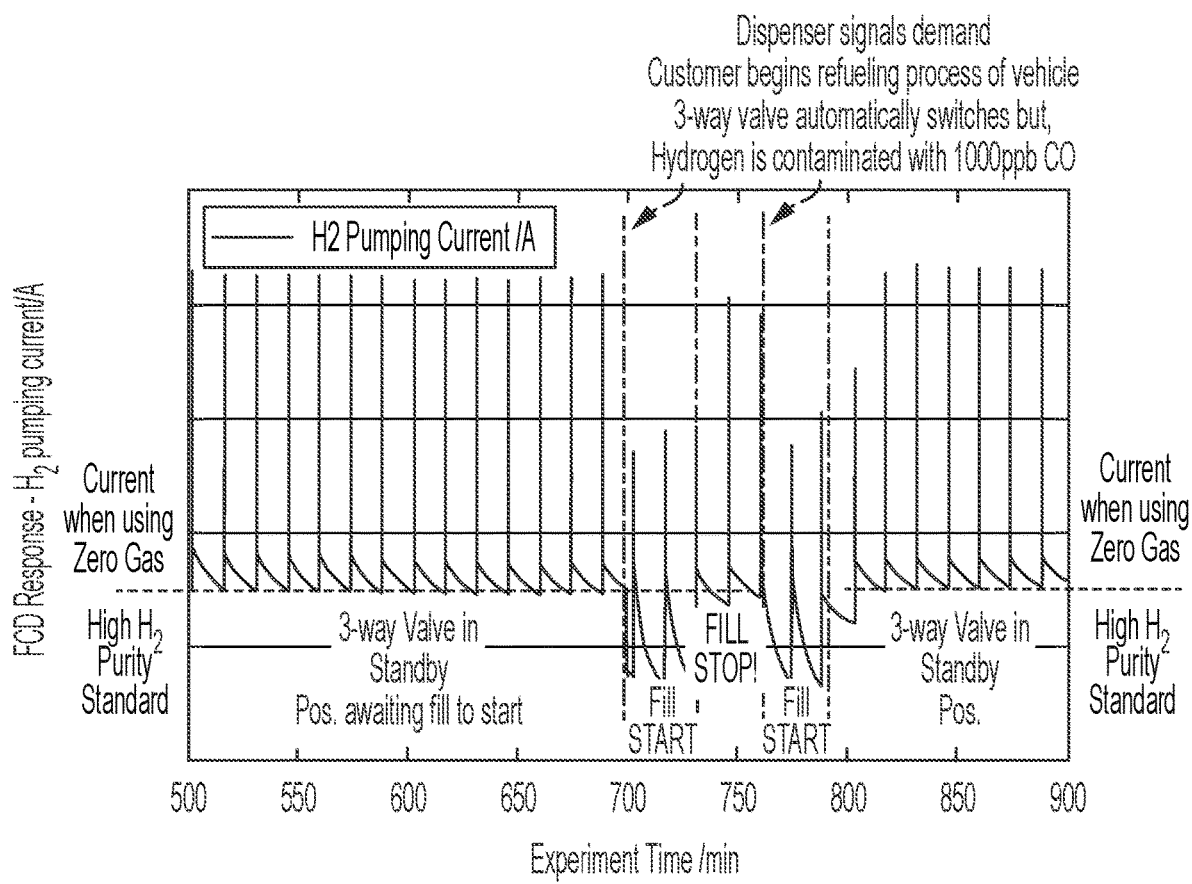
FIG. 20 is a graph showing current output from a FQA sampling pure hydrogen (99.9999%) from a reference bottle, followed by sampling hydrogen containing 1000 ppb CO, and then returning to sampling pure hydrogen (99.9999%) from a reference bottle.

Next, a bottle of hydrogen contaminated with 1000 ppb of CO (5x the allowable CO contamination in the current fuel quality standard) was connected to the 3-way valve instead of the product gas and the simulation was repeated. A dramatically different response was observed. FIG. 20 shows a stable reproducible baseline FQA response when sampling the zero-gas but within seconds of the changing the 3-way valve to begin sampling the contaminated hydrogen, there was a large measurable loss in the current measured by the FQA. The contaminated fuel flow was stopped, and the flow was switched back to the pure hydrogen. As shown in FIG. 20, the baseline current output was recovered within three cycles of the FQA.

Figure 21:
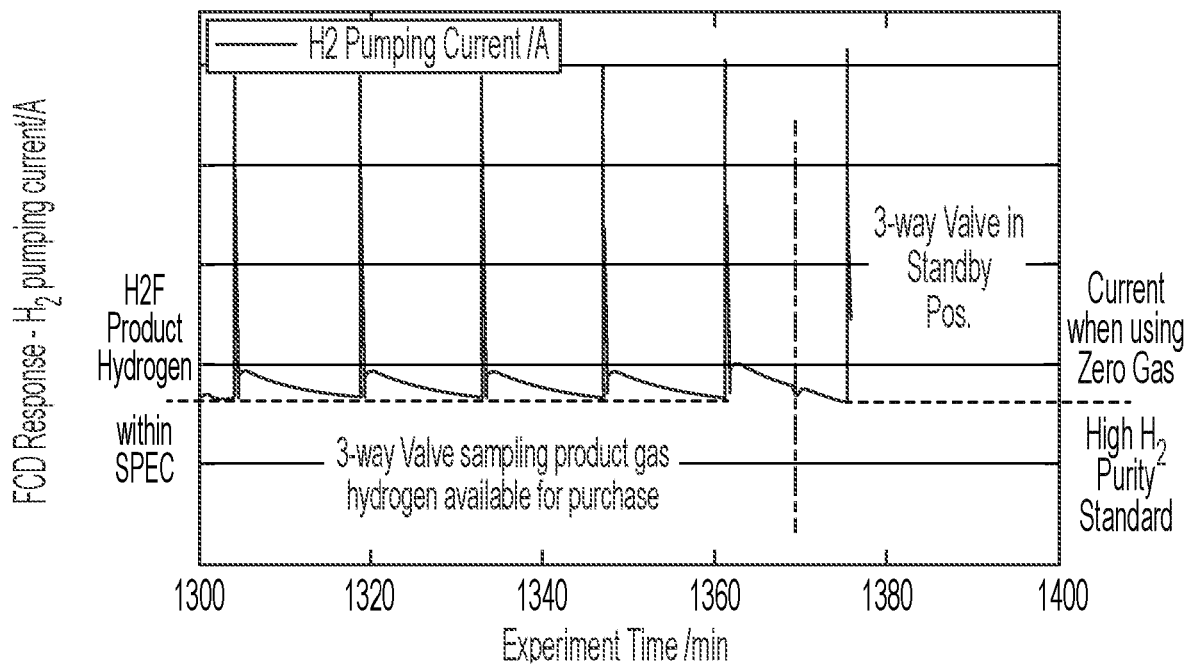
FIG. 21 is a graph showing that momentary flow disruptions when switching between a reference gas and a refueling gas did not trigger a false positive result from the FQA.
Figure 22:
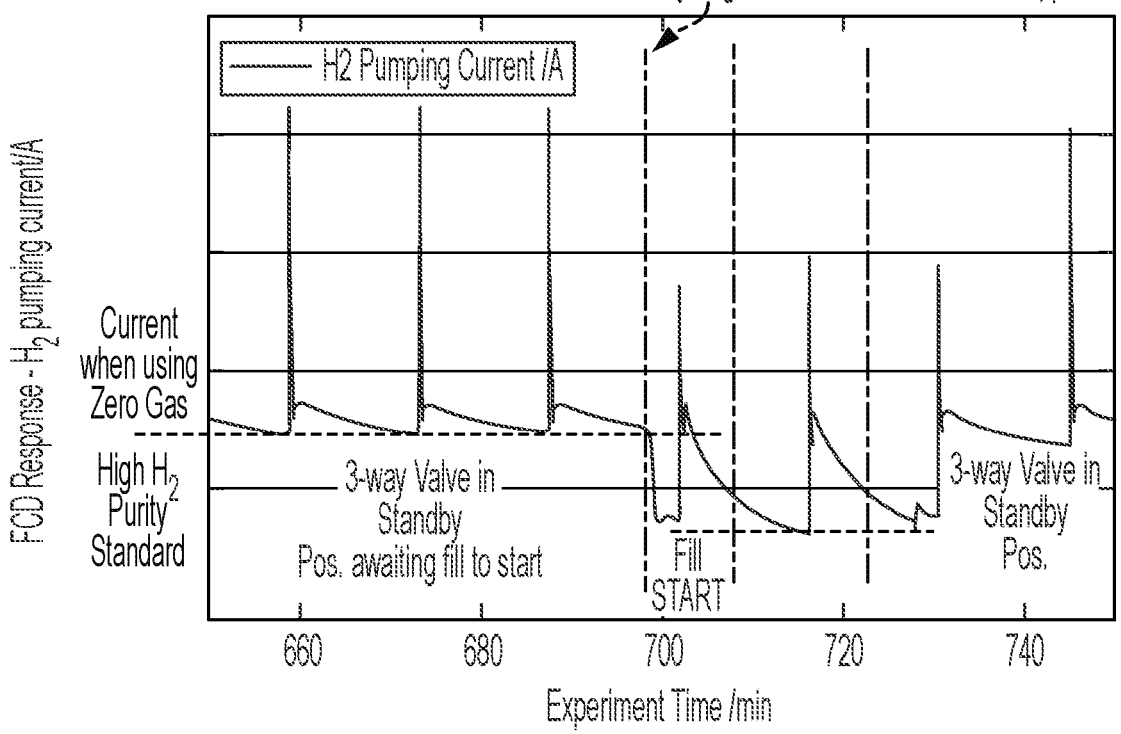
FIG. 22 is a graph magnifying the data shown in FIG. 8 when sampling hydrogen containing 1000 ppb CO.

Another trial was performed to demonstrate that the FQA response is unaffected by the momentary interruption in flow produced by actuating the 3-way valve, and will not indicate false detection of impurities due to momentary flow disruptions during the time the valve is moving when switching from sampling the stand-by "zero," or "reference," high-purity hydrogen gas to sampling fuel gas being dispensed (in this test another source of high-purity hydrogen gas). FIG. 21 shows that the FQA current when sampling high purity refueling hydrogen was identical to the current measured by the FQA after switching to the zero-gas hydrogen bottle; the vertical dashed line indicates when the gas was switched. The time for the valve to switch between gases in less than one second. Comparison of the null-response shown in FIG. 21 to sampling high-purity hydrogen to that of the hydrogen spiked with 1000 ppb CO contamination—on the same time scale of the graph—FIG. 22—shows the precipitous drop in current measured by the HCD. This unmistakable drop in current would be used to suspend the refueling process.

Example 4

Hydrogen Sulfide Detection

Figure 23:
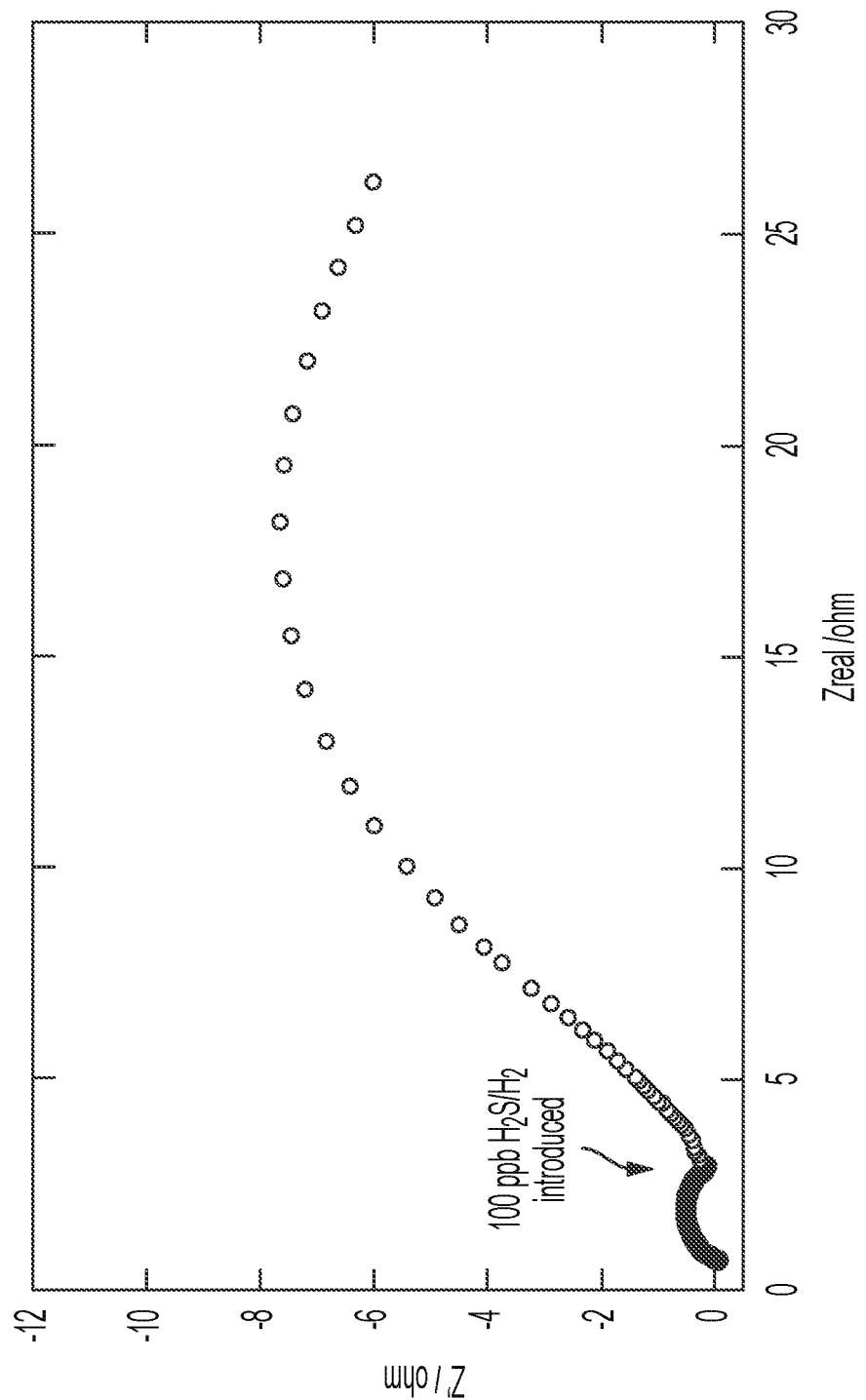
FIG. 23 is a graph showing increased impedance from a FQA sampling hydrogen containing 100 ppb $H_2S$, where the closed circles prior to introduction of $H_2S$ represent the impedance response when sampling zero or reference gas (high-purity $H_2$), and the open circles represent the impedance response showing poisoning from the 100 ppb $H_2S$.

Using a hydrogen contamination detector system as disclosed herein, the effects of $H_2S$ contamination were evaluated. A hydrogen gas comprising 100 ppb $H_2S$ was flowed through the HCD at a flow rate of 50 sccm and the impedance was measured. As shown in FIG. 23, the Z' and $Z_{real}$ increased as $H_2S$ bound to the electrodes. The closed circles prior to introduction of $H_2S$ represent the impedance response when sampling zero or reference gas (high-purity $H_2$). The open circles represent the impedance response—a large increase in both Z (real) and Z' (imaginary) impedance values—showing poisoning from the 100 ppb $H_2S$, an enormously damaging concentration compared to the SAE standard of 4 ppb.

Figure 24:
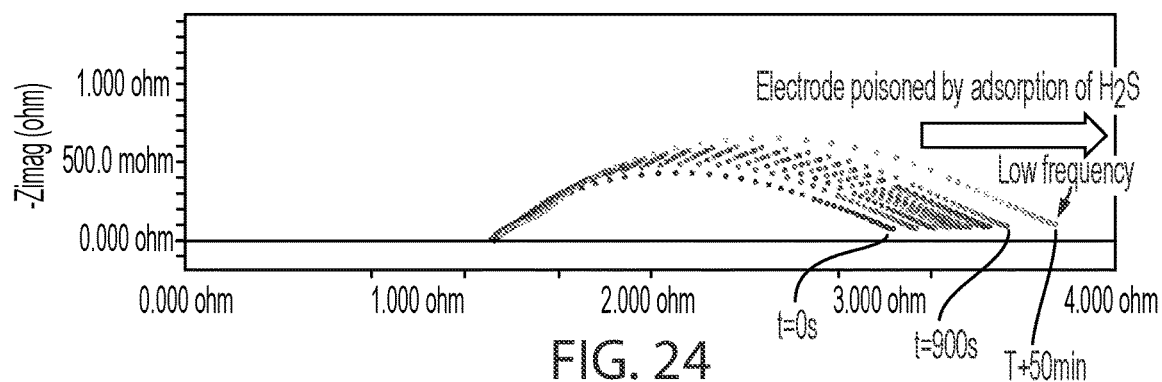
FIG. 24 is a graph showing increased low frequency impedance from a FQA sampling hydrogen containing 10 ppb $H_2S$ as a function of time ranging from 0 seconds to 50 minutes.

FIG. 24 shows the effect over time when hydrogen gas comprising 10 ppb $H_2S$ was flowed through the HCD. Both CO and $H_2S$ poison the working electrode and reduce $H_2$ oxidation reaction rate reflected as a decrease in the measured HCD proton pumping current. However, $H_2S$ contamination of the working electrode occurs much more slowly than CO poisoning. CO poisoning generally can be quantitatively measured in less than one cycle (e.g., less than ~900 s).

Figure 25:
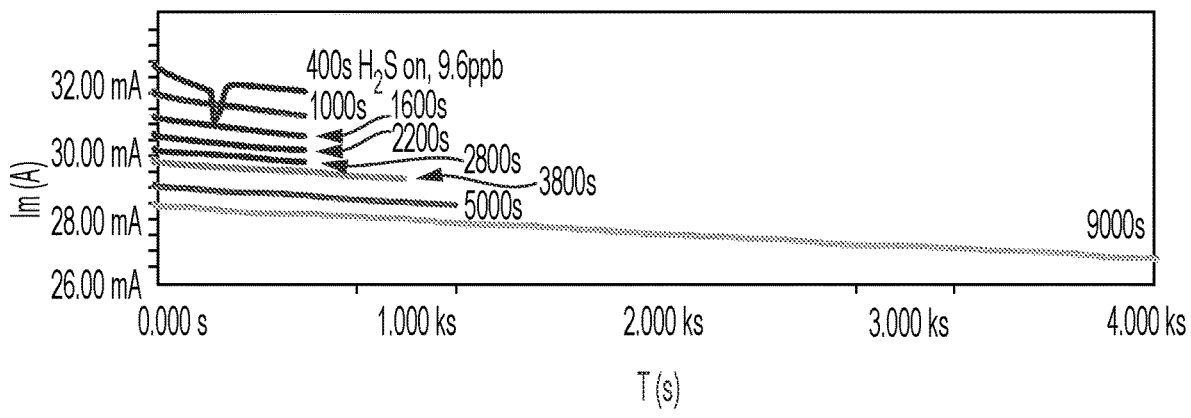
FIG. 25 shows a series of overlaid chronoamperometry scans showing kinetics of exposure to hydrogen containing 9.6 ppb $H_2S$ taken at times ranging from 400 seconds to over 9000 seconds.
Figure 26A:
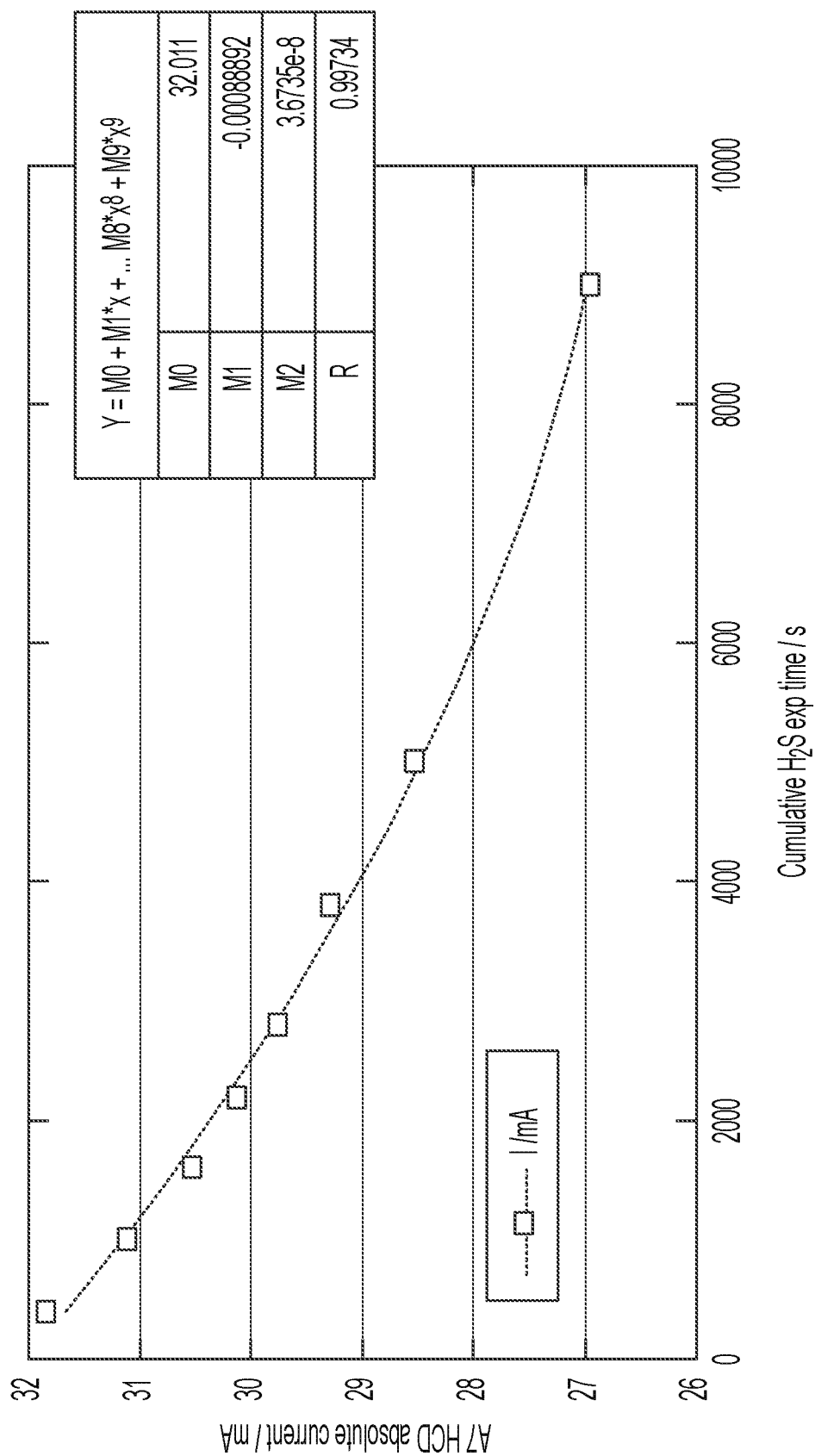
FIGS. 26A and 26B are graphs of absolute current vs. time (FIG. 26A) and percent current loss vs. time (FIG. 26B), showing kinetics of exposure to hydrogen containing 9.6 ppb $H_2S$ over 9000 seconds.
Figure 26B:
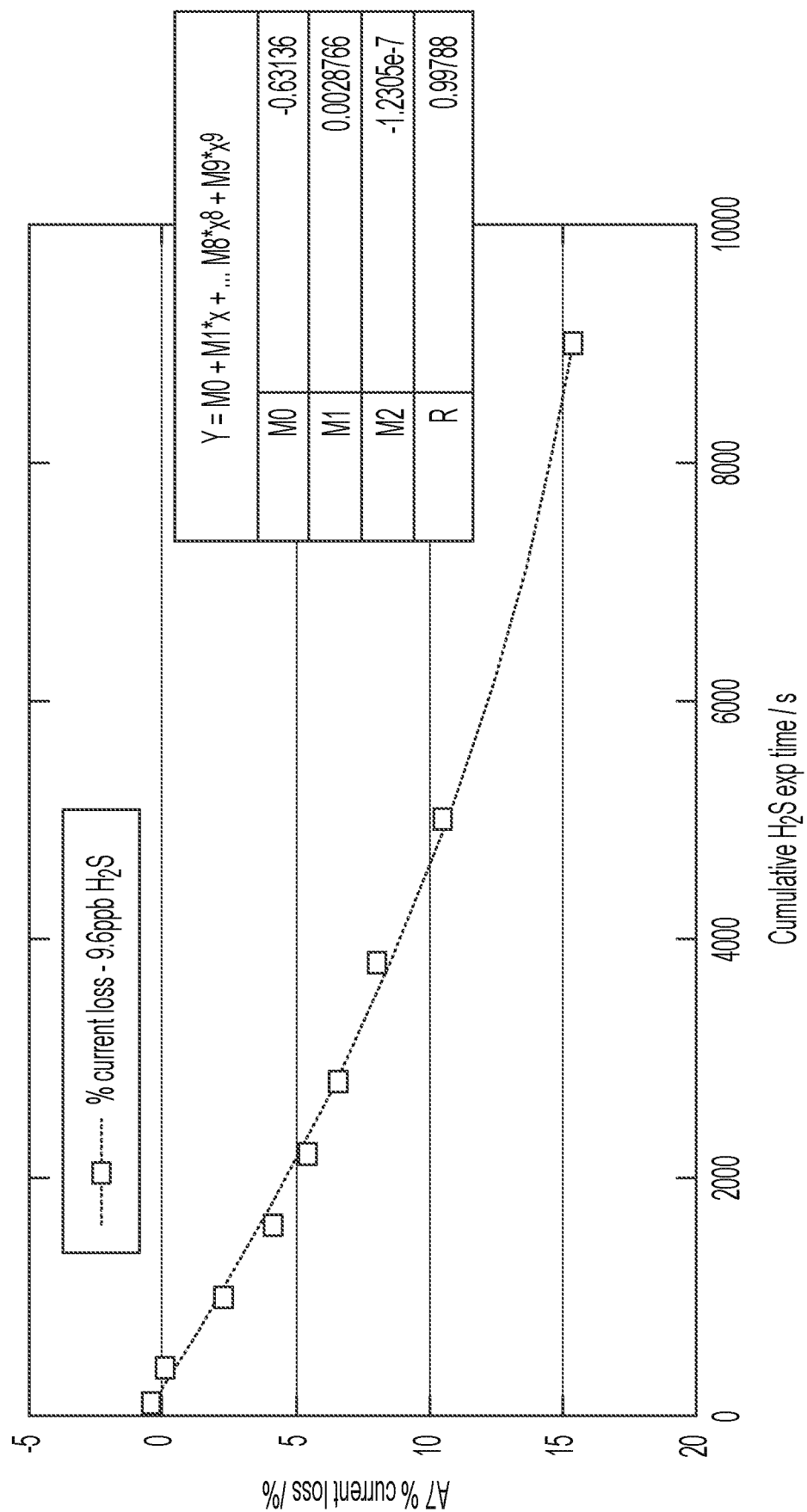

FIG. 25 is an overlay of a series of chronoamperometry scans showing that HCD current continuously falls during 9.6 ppb $H_2S/H_2$ exposure for at least 9000 seconds, with no application of clean-up voltage pulses. The time indicated after each scan is cumulative exposure time. FIGS. 26A and 26B are graphs showing the decrease in absolute current and the percent current loss over time following 9.6 ppb $H_2S/H_2$ exposure for 9000 seconds, with no application of clean-up voltage pulses.

Figure 27:
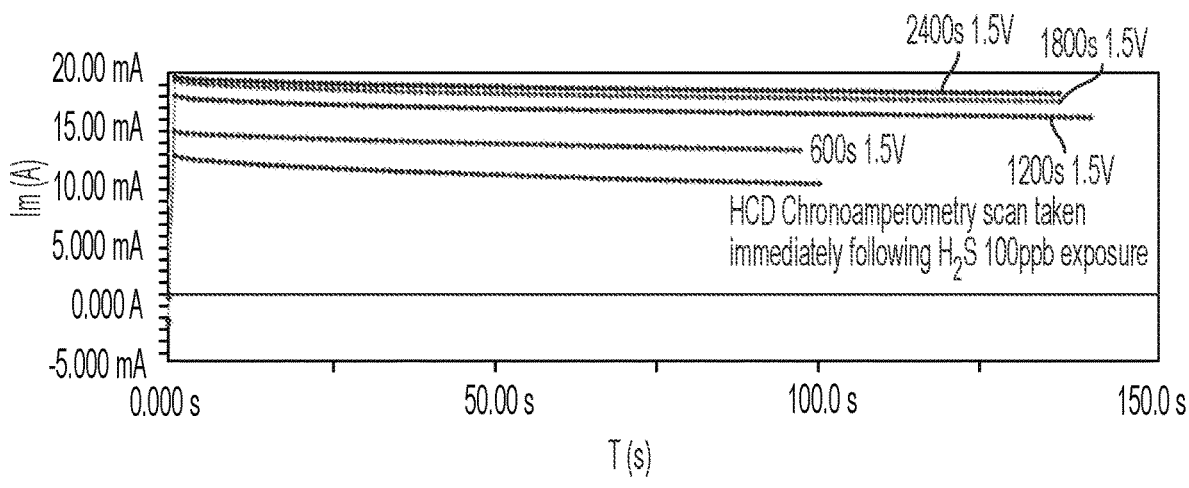
FIG. 27 are a series of overlaid chronoamperometry scans showing $H_2S$ removal with application of +1.5 V clean-up pulses for times ranging from 600 seconds to 2400 seconds.

After exposure to 100 ppb $H_2S/H_2$, a cleaning pulse of +1.5 V was applied to remove the bound $H_2S$ from the working electrode and return to pre-contaminated performance. As shown in FIG. 27, the +1.5 V cleaning pulses remove $H_2S$, but significantly more time is required to remove $H_2S$ compared to CO. For instance, CO contamination is completely removed from the working electrode in one to three applications of +1.5 V clean-up pulses lasting 15-30 seconds each, or 15-90 seconds total cleaning time, for CO contamination levels up to 100 ppm, compared to >2400 seconds (40 minutes) required to remove $H_2S$.

Figure 28:
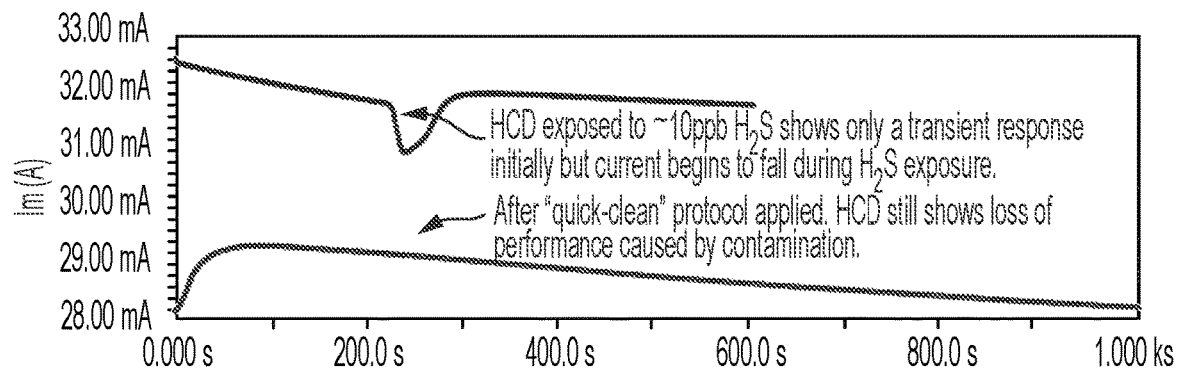
FIG. 28 are two overlaid chronoamperometry scans showing that a "quick recover" protocol using 5-second pulses of +1.5 V followed by 5 seconds at +0.1 V for ~120 cycles is not effective to remove $H_2S$ impurities from the working electrode.

After exposure to 10 ppb $H_2S/H_2$, a "quick recover" protocol using 5-second pulses of +1.5 V followed by 5 seconds at +0.1 V for ~120 cycles did very little return the HCD current to its pre-contaminated value as shown in FIG. 28. In contrast, the same protocol applied to a CO-contaminated HCD would have returned the HCD to its pre-contaminated level of performance.

Example 5

Current Loss as a Percentage

Figure 29:
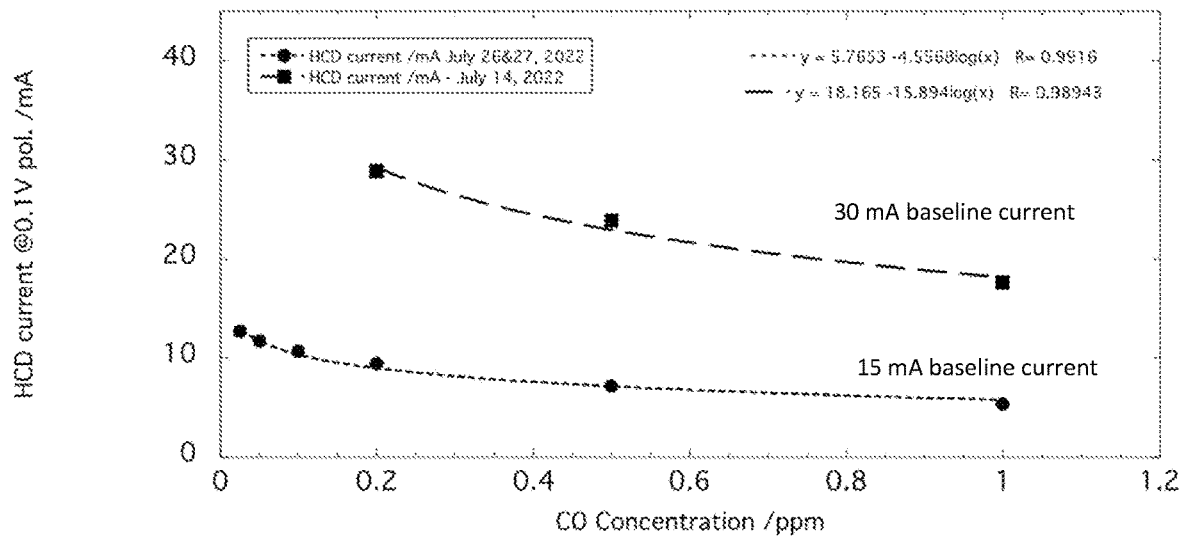
FIG. 29 is a graph showing the effect of varying concentrations of CO on baseline currents of 30 mA and 15 mA.

Using a fuel quality analyzer as disclosed herein, HCD currents were recorded at various CO concentrations introduced into the sample gas supply. An initial data set was collected with a baseline current of 30 mA. A subsequent data set was collected two weeks later with a baseline current of 15 mA. The results are shown in FIG. 29, where the data collected at 30 mA is represented by (■) and the data collected at 15 mA is represented by (•). As expected, the pumping current fell as [CO] rose, but two different calibration curves would be required in order to convert the absolute HCD current to a known [CO] value since the absolute changes in current were different at the two baseline currents.

Figure 30:
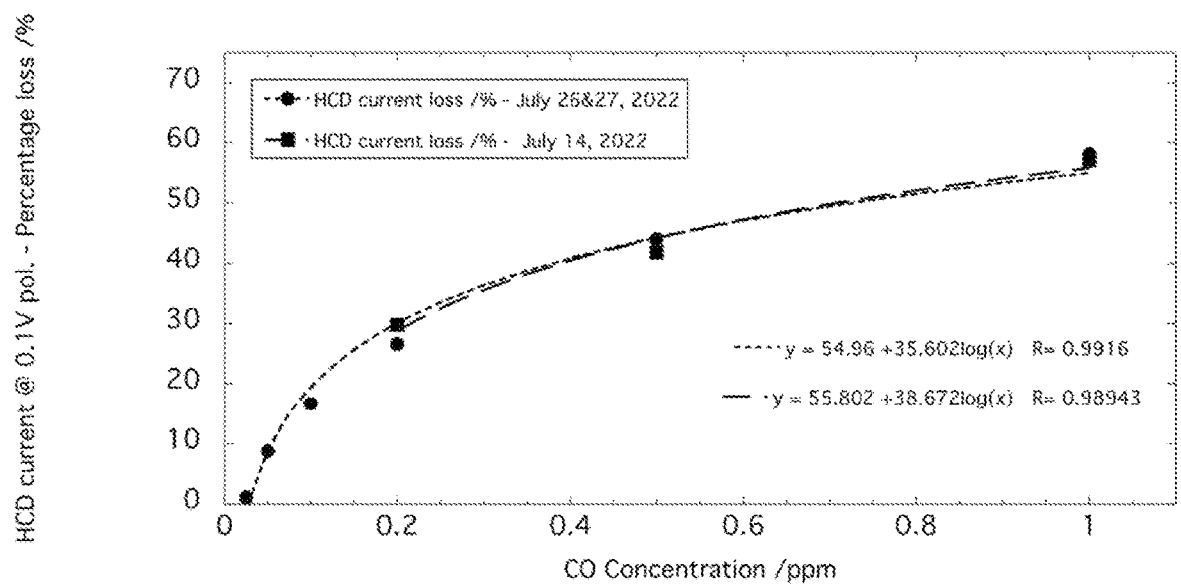
FIG. 30 is a graph showing the effect of varying concentrations of CO as a percentage change in the baseline currents of 30 mA and 15 mA.

In FIG. 30, the data is replotted as a percentage of current lost relative to the initial baselines of 30 mA (■) and 15 mA (•). Even though the magnitude of the HCD current decreased from 30 mA to 15 mA, the plot in FIG. 30 shows that the calibration curves were nearly identical. Using percent current loss to calculate impurity concentration rather than absolute current changes will allow less frequent calibration and lower operating costs for the user. Additionally, it will provide the flexibility to increase or decrease the baseline current without establishing a new calibration curve.

Example 6

Effect of Water Pressure/Flow Rate

Figure 31:
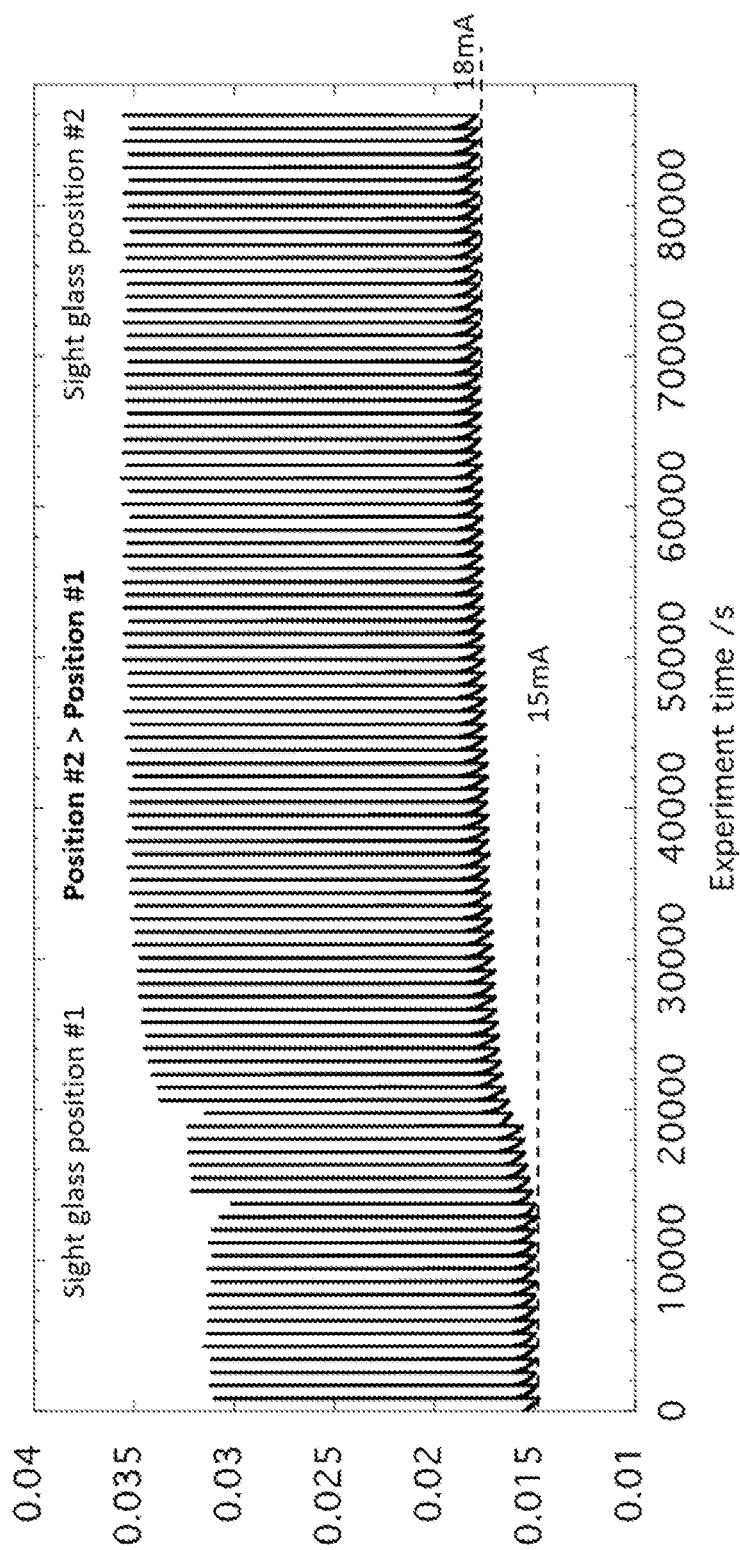
FIG. 31 is a graph showing the effect of water pressure on the current output from a FQA sampling pure hydrogen (99.9999%) from a reference bottle.

Using a hydrogen contamination detector system including an external water reservoir assembly (water sight glass)

according to FIG. 4, the HCD baseline current was evaluated at two different reservoir assembly heights, where position #2>position #1, and a constant sample gas flow rate of 100 mL/min. The results are shown in FIG. 31. When the water sight glass height was increased, the baseline HCD current increased from 15 mA to 18 mA.

Figure 32:
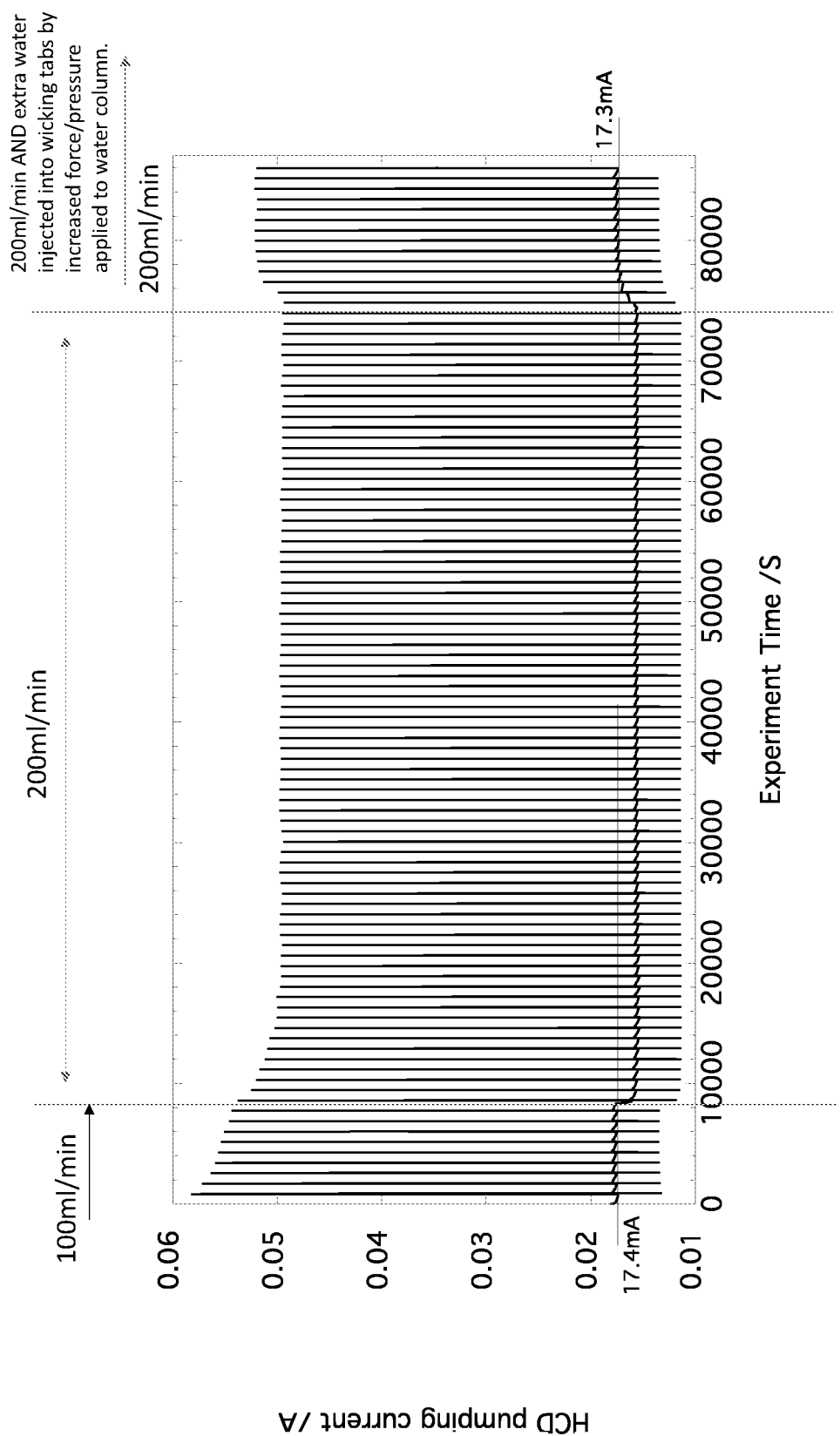
FIG. 32 is a graph showing the effects of gas flow rate and water pressure on the current output from a FQA sampling pure hydrogen (99.9999%) from a reference bottle.

Using the hydrogen contamination detector system including an external water reservoir assembly (water sight glass) according to FIG. 4, the HCD baseline current was evaluated at gas flow rates of 100 mL/min and 200 mL/min, with and without additional water injected into the wicking tabs by increased force/pressure applied to the water column. Hydrostatic pressure was increased by inserting a tip of a water bottle into the top of the water sight glass to apply hydrostatic pressure and then raising the height of the water column. The results are shown in FIG. 32. At the initial gas flow rate of 100 mL/min., the baseline current was 17.4 mA. Increasing the gas flow rate to 200 mL/min., resulted in a reduced baseline current as shown in FIG. 32. Increasing the applied water force/pressure successfully restored the baseline current to 17.3 mA.

At a flow rate of 100 mL/minute, a balance between evaporation rate and humidification rate is established. Doubling the flow rate of the sample gas to 200 mL/minute, results in decreased pumping current as the water evaporation rate exceeds the humidification rate. The data shows that the baseline current is restored at higher gas flow rates when additional pressure is applied to the water in the reservoir volume. The additional water pressure maintains the moisture content of the wicking tabs more effectively by increasing the humidification rate, thereby rebalancing the humidification and evaporation rates, and eliminating or minimizing the baseline current drop when the FQA is operated at higher gas flow rates.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system, comprising:
    a multiway valve comprising a first inlet, a second inlet, and an outlet;
    an analyzer fluidly connected to the outlet, the analyzer comprising
        an anode flow field plate defining a first fuel flow field channel,
        a cathode flow field plate defining a second fuel flow field channel,
        a humidified polymer electrolyte membrane between the anode and cathode flow field plates,
        a first electrode between the anode flow field plate and the humidified polymer electrolyte membrane, the first electrode having a first platinum loading,
        a second electrode between the cathode flow field plate and the humidified polymer electrolyte membrane, the second electrode having a second platinum loading higher than the first platinum loading, and
        a reservoir volume defined by the anode and cathode flow field plates and configured to retain water, wherein at least a portion of the humidified polymer electrolyte membrane extends into the reservoir volume, wherein the reservoir volume is separate from each of the first fuel flow field channel and the second fuel flow field channel, and wherein at least one of the first electrode or the second electrode comprises a first portion outside the reservoir volume and aligned with the first fuel flow field channel or the second fuel flow field channel, and a second portion extending into the reservoir volume; and
    a controller electrically coupled to the analyzer, the controller configured to
        receive a current output from the analyzer,
        compare the current output to a predetermined limit, and
        send a signal to a fuel dispensing system to suspend fuel flow through the fuel dispensing system if the current output is below the predetermined limit.

2. The system of claim 1, wherein the analyzer further comprises:
    an adjustable-height water reservoir assembly fluidly connected to the reservoir volume; or
    an external water reservoir fluidly connected to the reservoir volume and a pump operable to pump water from the external water reservoir into the reservoir volume.

3. The system of claim 1, wherein the controller is further configured to:
    open and close the first inlet of the multiway valve; and
    open and close the second inlet of the multiway valve.

4. The system of claim 1, wherein the multiway valve further comprises a switching device operable to open and close the first inlet and the second inlet, and the controller is further configured to operate the switching device.

5. The system of claim 1, wherein the controller is further configured to increase or decrease an operating voltage of the analyzer.

6. The system of claim 5, wherein the controller is configured to periodically increase or decrease the operating voltage at defined time intervals.

7. The system of claim 1, further comprising a flow control device between the outlet and the analyzer.

8. The system of claim 1, wherein the system is coupled to a fuel dispensing system, a fuel production system, a fuel transportation and delivery system, a fuel storage system, or a fuel purification system.

9. The system of claim 8, wherein the system is coupled to a fuel dispensing system, and the controller is configured to signal the fuel dispensing system to dispense fuel or cease dispensing fuel.

10. A method, comprising:
    initiating operation of a fuel system comprising a sample take-off valve and fuel dispensing outlet by initiating fuel flow through the fuel system to subsequently flow a portion of the fuel through the sample take-off valve and through a first inlet of a multiway valve, the multiway valve further comprising an outlet fluidly connected to an analyzer and a second inlet;
    flow the portion of the fuel through the outlet and into the analyzer, the analyzer operated at a first voltage and comprising
        an anode flow field plate defining a first fuel flow field channel,
        a cathode flow field plate defining a second fuel flow field channel,
        a humidified polymer electrolyte membrane between the anode and cathode flow field plates,
        a first electrode between the anode flow field plate and the humidified polymer electrolyte membrane, the first electrode having a first platinum loading, a second electrode between the cathode flow field plate and the humidified polymer electrolyte membrane, the second electrode having a second platinum loading higher than the first platinum loading,
a reservoir volume defined by the anode and cathode flow field plates and configured to retain water, wherein at least a portion of the humidified polymer electrolyte membrane extends into the reservoir volume, wherein the reservoir volume is separate from each of the first fuel flow field channel and the second fuel flow field channel, and wherein at least one of the first electrode or the second electrode comprises a first portion outside the reservoir volume and aligned with the first fuel flow field channel or the second fuel flow field channel, and a second portion extending into the reservoir volume, and
optionally, (i) an adjustable-height water reservoir assembly fluidly connected to the reservoir volume, or (ii) an external water reservoir fluidly connected to the reservoir volume and a pump operable to pump water from the external water reservoir into the reservoir volume;
receiving, with a controller electrically coupled to the analyzer, an initial current output of the analyzer operating at the first voltage, the controller further configured to (i) determine a predetermined limit for current output, (ii) compare the initial current output to the predetermined limit, (iii) send a signal to the fuel dispensing system, and (iv) increase or decrease an operating voltage of the analyzer;
comparing the initial current output to a predetermined limit; and
(i) sending a signal to the fuel system to suspend fuel flow through the fuel dispensing outlet if the initial current output is below the predetermined limit; or
(ii) flowing fuel through the fuel dispensing outlet if the initial current output is at or above the predetermined limit.

11. The method of claim 10, wherein an initial current output below the predetermined limit indicates that the fuel comprises impurities in an amount exceeding a determined acceptable level.

12. The method of claim 11, wherein:
the predetermined limit is a current output corresponding to 200 ppb CO in $H_2$, 4 ppb $H_2S$, 100 ppb $NH_3$, or any combination thereof; or
the predetermined limit is a current output corresponding to a percentage of a current output corresponding to a clean fuel devoid of impurities.

13. The method of claim 10, further comprising suspending fuel flow through the fuel dispensing outlet if the initial current output is at or above the predetermined limit.

14. The method of claim 10, wherein fuel is flowing through the fuel dispensing system, wherein:
(i) a portion of the fuel continuously flows through the first inlet and into the analyzer while flowing fuel through the fuel dispensing system, the method further comprising continuously or intermittently receiving a current output of the analyzer and comparing the current output at the first voltage to the predetermined limit, and sending a signal to the fuel dispensing system to suspend fuel flow through the fuel dispensing outlet if the current output at the first voltage is below the predetermined limit; or
(ii) a portion of the fuel flows through the first inlet and into the analyzer at periodic intervals while fuel continuously flows through the fuel dispensing outlet, the method further comprising receiving a current output of the analyzer at the first voltage during the periodic intervals and comparing the current output to the predetermined limit, and sending a signal to the fuel dispensing system to suspend fuel flow through the fuel dispensing outlet if the current output at the first voltage is below the predetermined limit.

15. The method of claim 10, further comprising:
applying an increased voltage pulse to the analyzer at periodic intervals; and
subsequently operating the analyzer at the first voltage.

16. The method of claim 15, wherein
(i) the first voltage is +0.08 V to +0.5 V;
(ii) the increased voltage is +1.0 V to +1.6 V; or
(iii) both (i) and (ii).

17. The method of claim 10, further comprising calibrating the analyzer prior to flowing the fuel through the first inlet of the multiway valve by:
closing the first inlet;
flowing a clean fuel devoid of impurities through the second inlet and into the analyzer;
receiving an initial clean fuel current output, at the first voltage, corresponding to the clean fuel;
flowing an impure fuel comprising a known concentration of impurities through the second inlet and into the analyzer;
receiving an initial impure fuel current output, at the first voltage, corresponding to the known concentration of impurities; and
determining the predetermined limit based at least in part on the initial clean fuel current output and the initial impure fuel current output.

18. The method of claim 17, further comprising:
ceasing flow of the impure fuel through the second inlet;
flowing the clean fuel through the second inlet;
applying an increased voltage pulse to the analyzer while flowing the clean fuel through the outlet and into the analyzer, thereby removing bound impurities from the anode, the cathode, or both; and
subsequently operating the analyzer at the first voltage.

19. The method of claim 10, wherein:
(i) the fuel comprises hydrogen; or
(ii) the impurities comprise carbon monoxide, hydrogen sulfide, or a combination thereof; or
(iii) both (i) and (ii).

20. The method of claim 19, wherein the impurities comprise carbon monoxide, hydrogen sulfide, or a combination thereof, the method further comprising determining whether the impurities comprise carbon monoxide, hydrogen sulfide, or carbon monoxide and hydrogen sulfide by:
while fuel flows through the outlet and into the analyzer operating at the first voltage, receiving, with the controller, a fuel current output that is below the predetermined limit;
ceasing flow of the fuel through the first inlet;
flowing the clean fuel through the second inlet;
applying an increased voltage pulse of +1.0 V to +1.6 V to the analyzer for 5 to 30 seconds while flowing the clean fuel through the outlet and into the analyzer;
subsequently operating the analyzer at the first voltage;
receiving, with the controller, a clean fuel current output at the first voltage; and
comparing the clean fuel current output to the predetermined limit, the fuel current output, or both the predetermined limit and the fuel current output, wherein (i) if the clean fuel current output is at or above the predetermined limit, the impurity is determined to be carbon monoxide; or
(ii) if the clean fuel current output is below the predetermined limit but greater than the fuel current output, the impurity comprises a combination of carbon monoxide and hydrogen sulfide; or
(iii) if the clean fuel current output is below the predetermined limit and the same as the fuel current output, the impurity is hydrogen sulfide.

* * * * *